US011659432B2

(12) United States Patent
Agiwal et al.

(10) Patent No.: US 11,659,432 B2
(45) Date of Patent: *May 23, 2023

(54) METHOD AND APPARATUS FOR MANAGING DATA COMMUNICATION IN WIRELESS COMMUNICATION NETWORK

(71) Applicant: Samsung Electronics Co., Ltd., Suwon-si (KR)

(72) Inventors: Anil Agiwal, Suwon-si (KR); Youngbin Chang, Anyang-si (KR); Anshuman Nigam, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 9 days.

This patent is subject to a terminal disclaimer.

(21) Appl. No.: 17/164,579

(22) Filed: Feb. 1, 2021

(65) Prior Publication Data

US 2021/0160729 A1 May 27, 2021

Related U.S. Application Data

(63) Continuation of application No. 16/322,916, filed as application No. PCT/KR2017/008293 on Aug. 1, 2017, now Pat. No. 10,911,977.

(30) Foreign Application Priority Data

Aug. 1, 2016 (IN) .............................. 201641026242
Jul. 28, 2017 (IN) .............................. 201641026242

(51) Int. Cl.
*H04W 28/02* (2009.01)
*H04W 76/12* (2018.01)
(Continued)

(52) U.S. Cl.
CPC ... *H04W 28/0263* (2013.01); *H04W 28/0268* (2013.01); *H04W 28/06* (2013.01);
(Continued)

(58) Field of Classification Search
CPC ......... H04W 28/0263; H04W 28/0268; H04W 28/06; H04W 76/15; H04W 76/11; H04W 76/12
See application file for complete search history.

(56) References Cited

U.S. PATENT DOCUMENTS 6,738,361 B1   5/2004  Immonen et al.
2005/0058068 A1  3/2005  Ben Ali et al.
(Continued)

FOREIGN PATENT DOCUMENTS

CN   102355692 A   2/2012
WO   2009/063434 A1  5/2009

OTHER PUBLICATIONS

Korean Intellectual Property Office, "Office Action" dated Oct. 22, 2021, in connection with Korean Patent Application No. 10-2019-7006345, 10 pages.
(Continued)

*Primary Examiner* — Rina C Pancholi

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security, and safety services. Embodiments herein disclose a UE for managing a data communication in a wireless communication network. The UE includes a DRB management unit configured to determine a DRB for transmitting a packet based on QoS flow identifier and a PDU session associated with the packet
(Continued)

and mapping of the QoS flow identifiers to the DRBs for each established PDU session.

24 Claims, 14 Drawing Sheets

(51) Int. Cl.
*H04W 76/15* (2018.01)
*H04W 76/11* (2018.01)
*H04W 28/06* (2009.01)

(52) U.S. Cl.
CPC ............ *H04W 76/11* (2018.02); *H04W 76/12* (2018.02); *H04W 76/15* (2018.02)

(56) References Cited

U.S. PATENT DOCUMENTS

| | | | |
|---|---|---|---|
| 2008/0056273 | A1 | 3/2008 | Pelletier et al. |
| 2009/0129342 | A1 | 5/2009 | Hwang et al. |
| 2010/0095017 | A1 | 4/2010 | Ghetie et al. |
| 2013/0044708 | A1* | 2/2013 | Kim ................... H04N 21/6131 370/329 |
| 2013/0201924 | A1 | 8/2013 | Song et al. |
| 2013/0242887 | A1 | 9/2013 | Zhu et al. |
| 2015/0071059 | A1 | 3/2015 | Fu et al. |
| 2015/0264738 | A1 | 9/2015 | Lee et al. |
| 2016/0338102 | A1 | 11/2016 | Nuggehalli et al. |
| 2017/0041968 | A1 | 2/2017 | Jin |
| 2018/0049218 | A1 | 2/2018 | Hapsari et al. |
| 2018/0317120 | A1* | 11/2018 | Wang ................... H04W 76/11 |

OTHER PUBLICATIONS

Zte, "Further discussion on the RAN QoS control", 3GPP TSG-RAN WG2 Meeting #94, R2-163746, 8 pages.

Huawei, HiSilicon, "Considerations on 5G RAN QoS framework", 3GPP TSG-RAN2 Meeting #94, May 23-27, 2016, R2-164267, 2 pages.

Nokia et al., "RAN QoS framework", 3GPP TSG-RAN WG3 Meeting #92, R3-161359, 5 pages.

Supplementary European Search Report dated Feb. 12, 2020 in connection with European Patent Application No. 17 83 7220, 8 pages.

ISA/KR, "International Search Report and Written Opinion of the International Searching Authority," International Application No. PCT/KR2017/008293, dated Nov. 10, 2017, 11 pages.

Qualcomm Incorporated et al., "Principles for QoS in the RAN," R2-164119, 3GPP TSG RAN WG2 Meeting #94, Nanjing, China, May 23-27, 2016, 5 pages.

Interdigital Communications, "Radio Bearers and Per-Flow QoS for New Radio Access," R2-164089, 3GPP TSG RAN WG2 Meeting #94, Nanjing, China, May 23-27, 2016, 7 pages.

Samsung, "NR user plane architecture for supporting multiple services," R2-163740, 3GPP TSG RAN WG2 Meeting #94, Nanjing, China, May 23-27, 2016, 8 pages.

European Search Report dated Jun. 21, 2021, in connection with European Application No. 21160221.4, 6 pages.

Notification of the First Office Action dated Jul. 27, 2021, in connection with Chinese Application No. 201780048392.0, 13 pages.

Intel et al., "Update to Solution 2.2", SA WG2 Meeting #116, Jul. 11-15, 2016, Vienna, AT, S2-164091, 7 pages.

LG Electronics, "Update of Solution 6.2.2—Flow based QoS framework", SA WG2 Meeting #115, May 23-27, 2016, Nanjing, P.R. China, S2-162822, 5 pages.

Samsung, "Flow-based QoS Framework using Flow Marker", SA WG2 Meeting #115, May 23-27, 2016, Nanjing, China, S2-162352, 4 pages.

\* cited by examiner

METHOD AND APPARATUS FOR MANAGING DATA COMMUNICATION IN WIRELESS COMMUNICATION NETWORK

CROSS-REFERENCE TO RELATED APPLICATIONS

This application is a continuation of U.S. patent application Ser. No. 16/322,916 filed on Feb. 1, 2019, which is a 371 of International Application No. PCT/KR2017/008293 filed on Aug. 1, 2017, which claims priority to Indian Patent Application No. 201641026242 filed on Aug. 1, 2016, and Indian Patent Application No. 201641026242 filed on Jul. 28, 2017, the disclosures of which are herein incorporated by reference in their entirety.

BACKGROUND

1. Field

The present disclosure relates to a wireless communication system. More particularly related to a method and apparatus for managing data communication in a next generation communication system such as 5G wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-point (CoMP) transmission, reception-end interference cancellation and the like. In the 5G system, hybrid frequency shift key (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud Radio Access Network (RAN) as the above-described Big Data processing technology may also be considered to be as an example of convergence between the 5G technology and the IoT technology.

Several broadband wireless technologies have been developed to meet the growing number of broadband subscribers and to provide more and better applications and services. The second generation wireless communication system has been developed to provide voice services while ensuring the mobility of users. The third generation wireless communication system supports not only a voice service but also data service. In recent years, the fourth wireless communication system has been developed to provide high-speed data service. However, currently, the fourth generation wireless communication system suffers from lack of resources to meet the growing demand for high speed data services. So, fifth generation wireless communication system is being developed to meet the growing demand for high speed data services, support ultra-reliability and low latency applications and support a massive machine type communication.

In an existing system, a bearer service architecture to support QoS is shown in the FIG. 1. An Evolved Packet Service (EPS) bearer is established between a user equipment (UE) 110 and a Public Data Network (PDN) gateway for the transportation of an application packet (or an internet protocol (IP) packet). The EPS bearer is a bearer corresponding to an IP packet flow (or a service data flow) with a defined QoS between the UE 110 and the PDN gateway. The EPS bearer may be bidirectional or unidirectional. Multiple EPS bearers can be established for the UE 110 in order to provide different QoS streams or connectivity to different PDNs. In an example, a user might be engaged in a voice call (i.e., VoIP call) while at the same time performing web browsing or File Transfer Protocol (FTP) download. A VoIP EPS bearer would provide the necessary QoS for the voice call, while a best-effort EPS bearer would be suitable for the web browsing or the FTP session.

One EPS bearer and EUTRA Radio Access Bearer (E-RAB) is established when the UE 110 connects to the PDN, and that remains established throughout the lifetime of the PDN connection to provide the UE 110 with always-on IP connectivity to that PDN. This bearer is referred to as the default EPS bearer. Any additional EPS bearer/E-RAB that is established to the same PDN is referred to as a dedicated bearer. The initial bearer level QoS parameter values of the default bearer are assigned by the network, based on a subscription data. The decision to establish or modify the dedicated bearer can only be taken by the EPC, and the bearer level QoS parameter values are always assigned by the EPC.

The EPS bearer/E-RAB is the level of granularity for bearer level QoS control in the network. That is, service data flows (SDFs) mapped to the same EPS bearer receive the same bearer level packet forwarding treatment (e.g., scheduling policy, queue management policy, rate shaping policy, RLC configuration, etc.).

The EPS bearer/E-RAB is referred to as a Guaranteed Bit Rate (GBR) bearer if the dedicated network resources related to a GBR value that is associated with the EPS bearer/E-RAB are permanently allocated (e.g., by an admission control function in the eNodeB) at the bearer establishment/modification. Otherwise, the EPS bearer/E-RAB is referred to as a Non-GBR bearer. The dedicated bearer can either be the GBR or the Non-GBR bearer while a default bearer shall be a Non-GBR bearer.

Applications/IP flows or SDFs are mapped to the EPS bearer based on a packet classification rule or a Traffic Flow Template (TFT) i.e., source IP address, destination IP address and port number of the IP flow or the SDF. An UL TFT in the UE 110 binds the SDF to an EPS bearer in an uplink (UL) direction. Multiple SDFs can be multiplexed onto the same EPS bearer by including multiple uplink packet filters in the UL TFT. A DL TFT in the PDN GW 140 binds the SDF to the EPS bearer in a downlink (DL) direction. Multiple SDFs can be multiplexed onto the same EPS bearer by including multiple downlink packet filters in the DL TFT. An E-RAB transports the packets of the EPS bearer between the UE 110 and the EPC. When the E-RAB exists, there is a one-to-one mapping between the E-RAB and the EPS bearer. A data radio bearer transports the packets of the EPS bearer between the UE 110 and the one or more eNB(s) 120. When a data radio bearer exists, there is a one-to-one mapping between the data radio bearer and the EPS bearer/E-RAB.

Further, a S1 bearer transports the packets of an E-RAB between the eNodeB 120 and a serving GW 130. A S5/S8 bearer transports the packets of the EPS bearer between the serving GW 130 and the PDN GW 140. The UE 110 stores the mapping between an uplink packet filter and a data radio bearer to create the binding between the SDF and the data radio bearer in the uplink. The PDN GW 140 stores a mapping between a downlink packet filter and the S5/S8a bearer to create the binding between the SDF and the S5/S8a bearer in the downlink. Further, the eNB 120 stores a one-to-one mapping between the data radio bearer and the S1 bearer to create the binding between the data radio bearer and the S1 bearer in both the uplink and downlink. Further, the serving GW 130 stores the one-to-one mapping between the S1 bearer and the S5/S8a bearer to create the binding between the S1 bearer and the S5/S8a bearer in both the uplink and downlink.

The data radio bearer and the S5/S8 bearer corresponding to each EPS bearer is established when the UE 110 enters the RRC connected state from an IDLE state. A new data radio bearer can be setup during the connected state if a new EPS bearer is established. An existing data radio bearer is released during connected state if a corresponding EPS bearer is released. All data radio bearers are released when RRC connection is released. The EPS bearer ID, a PDCP configuration, the RLC configuration and a logical channel configuration are provided by the eNB 120 in the RRC connection reconfiguration message when the DRB is established. The EPS bearers configuration provided by a NAS signaling included an EPS bearer ID, QoS info and TFT.

SUMMARY

In the existing bearer concept, the SDFs with same characteristic are mapped to same bearer. An Over-the-air (OTA) services are mapped to same best effort EPS bearer. If the SDFs of difference services are mixed together in the same bearer then service "starvation or blockage", i.e., a large chunk of data in the buffer delays packets belonging to a different service or delays in TCP connection establishment process when the TCP connection request/response packets get to end of the queue. In the next generation communication design, it is proposed to remove EPS bearer to reduce signaling overhead and to provide more QoS granularity. The OTA services can be treated differently if operator desires to do so. The flow based QoS framework is being developed. In a flow based QoS framework, the PDU session is established between the UE 110 and the data network. The PDU session may carry multiple flows requiring QoS differentiation. The QoS differentiation between several flows multiplexed on the same PDU session is provided by means of QoS marking applied to each packet. In the flow based QoS framework, existing methods of establishing the data radio bearers and mapping packets to the data radio bearers cannot be used as the EPS bearer is not established between the UE 110 and the PDN. In the flow based QoS framework, there is needed a robust method and apparatus for establishing the data radio bearer and mapping the packets of the PDU session to the data radio bearer in the DL and the UL.

Thus, it is desired to address the above mentioned disadvantages or other shortcomings or at least provide a useful alternative.

Embodiments herein disclose a method for managing a data communication in a wireless communication network. The method includes receiving, by a gNodeB, a plurality of packets of at least one QoS flow from a network entity. A QoS flow identifier (QFI) associated with the at least one QoS flow is received in a header of each packet. Further, the method includes mapping, by the gNodeB, each received packet of the at least one QoS flow to a DRB. The at least one QoS flow is mapped to the DRB based on the QFI associated with the at least one QoS flow.

In an embodiment, the plurality of packets of the at least one QoS flow is received, by the gNodeB, from the network entity by receiving the packet on at least one PDU tunnel between the gNodeB and the network entity. The PDU tunnel is separate for receiving the plurality of packets of the at least one QoS flow of each PDU session.

In an embodiment, each received packet from the network entity of the at least one QoS flow is mapped, by the gNodeB, to the DRB by mapping the received packet to an already established DRB if the list of at least one QoS flow identifiers associated with the established DRB includes the QoS flow identifier of the received packet and the established DRB is associated with the PDU session of the received packet.

In an embodiment, each received packet from the network entity of the QoS flow is mapped, by the gNodeB, to the DRB by establishing a new DRB if none of the established DRBs is associated with the PDU session and the QoS flow of the received packet, transmit a signaling message including the DRB configuration of new DRB to a User Equipment (UE), wherein the DRB configuration includes one or more of the PDU session identifier and a list of one or more QoS flow identifiers of the QoS flows associated with the DRB, and mapping the received packet to newly established DRB.

In an embodiment, each received packet from the network entity of the QoS flow is mapped to the DRB by updating configuration of an already established DRB associated with the PDU session of the received packet if none of the established DRBs for the PDU session of received packet is associated with the QoS flow of the received packet, where the QoS flow identifier of the received packet is added to the list of QoS flow identifiers of the updated DRB, transmitting the signaling message including the DRB configuration of the updated DRB to the UE, where the DRB configuration includes the at least one of the PDU session identifier and a list of at least one of QoS flow identifiers of the QoS flows associated with the DRB, and mapping the received packet to the updated DRB.

In an embodiment, the QoS flow is mapped to only one DRB.

In an embodiment, the DRB is mapped to the at least one QoS flow of same PDU session.

In an embodiment, each of the DRB defines a packet forwarding treatment on a radio interface to data exchange between the UE and the gNodeB in the wireless communication network.

In an embodiment, the plurality of packets of the at least one QoS flow is received, by the gNodeB (i.e., target gNodeB), from another gNodeB (i.e., source gNodeB). The QoS flow identifier associated with each packet is also received by the gNodeB from another gNB.

In an embodiment, the plurality of packets of the at least one QoS flow is received, by the gNodeB (i.e., target gNodeB), from another gNodeB (i.e., source gNodeB). The QoS flow identifier and the PDU session identifier of PDU session associated with each packet is also received by the gNodeB from another gNodeB.

Embodiments herein disclose a method for managing a data communication in a wireless communication network. The method includes determining, by a UE, a DRB for transmitting a packet based on a QoS flow identifier and a PDU session associated with the packet and mapping of the QoS flow identifiers to the DRBs for each established PDU session. Further, the method includes performing by the UE one of: mapping the packet to an established non-default DRB if the list of at least one of QoS flow identifiers associated with the DRB includes the QoS flow identifier of the packet and the DRB is associated with the PDU session of the packet, and mapping the packet to a default DRB associated with the PDU session of the packet if none of the established non-default DRBs is associated with the PDU session and the QoS flow identifier of the packet. Further, the method includes transmitting the packet over the mapped DRB.

In an embodiment, the UE receives mapping of the QoS flow identifiers to the DRBs for each established PDU session from the gNodeB in a signaling message.

In an embodiment, the UE receives the PDU session identifier and a list of at least one of QoS flow identifiers associated with each DRB from the gNodeB in the signaling message.

In an embodiment, the UE receives a list of at least one of QoS flow identifiers associated with each DRB from the gNodeB in the signaling message.

In an embodiment, the UE receives from the gNodeB the default DRB configuration associated with the PDU session in the signaling message.

In an embodiment, the UE receives from the gNodeB configuration of a default DRB associated with the PDU session in a signaling message after the establishment of RRC connection.

In an embodiment, the UE includes at least one of the QoS flow identifier and the PDU session identifier in a packet header of the packet transmitted on the default DRB.

In an embodiment, on receiving a packet on default DRB, the gNodeB establishes a new DRB for the QoS flow identifier and the PDU session identifier received in the packet header of the packet received on the default DRB. Further, the gNodeB transmits a signaling message including the DRB configuration of new DRB, where the DRB configuration includes one or more of a PDU session identifier and a list of one or more QoS flow identifiers of the QoS flows associated with the DRB.

In an embodiment, on receiving a packet on default DRB, the gNodeB establishes a new DRB for the QoS flow identifier received in the packet header of the packet received on the default DRB. Further, the gNodeB transmits a signaling message including the DRB configuration of new DRB, where the DRB configuration includes a list of one or more QoS flow identifiers of the QoS flows associated with the DRB.

In an embodiment, on receiving a packet on default DRB, the gNodeB updates an already established DRB corresponding to the PDU session identifier received in the packet header of packet received on the default DRB. The QoS flow identifier of the packet received on the default DRB is added to the list of the QoS flow identifiers of the updated DRB. Further, the gNodeB transmits a signaling message including the DRB configuration of the updated DRB, where the DRB configuration includes one or more of the PDU session identifier and a list of one or more QoS flow identifiers of the QoS Flows associated with DRB.

In an embodiment, on receiving a packet on default DRB, the gNodeB updates an already established DRB. The QoS flow identifier of the packet received on the default DRB is added to the list of the QoS flow identifiers of the updated DRB. Further, the gNodeB transmits a signaling message including the DRB configuration of the updated DRB, where the DRB configuration includes a list of one or more QoS flow identifiers of the QoS Flows associated with DRB.

Embodiments herein disclose an apparatus for managing a data communication in a wireless communication network. The apparatus includes a processor and a memory to store DRB configurations. A DRB management unit is coupled to the memory and the processor. The DRB management unit is configured to receive a plurality of packets of at least one QoS flow from a network entity. A QoS flow identifier associated with the at least one QoS flow is received in a header of each packet. The DRB management unit is configured to receive a plurality of packets of the at least one QoS flow from another gNodeB (i.e., source gNodeB). At least one of QoS flow identifier and PDU session identifier of the PDU session associated with each packet is also received. Further, the DRB management unit is configured to map each received packet of the at least one QoS flow to the DRB. The at least one QoS flow is mapped to the DRB based on the ID associated with the at least one QoS flow and a QoS parameter.

Embodiments herein disclose a UE for managing a data communication in a wireless communication network. The UE includes a processor and a memory to store a DRB configuration received from a gNodeB in the wireless communication network. A DRB management unit is coupled to the memory and the processor. The DRB management unit is configured to determine a DRB for transmitting a packet based on a QoS flow identifier and a PDU session associated with the packet and mapping of the QoS flow identifiers to the DRBs for each established PDU session. Further, the UE is configured to perform one of: map the packet to an established non-default DRB if the list of at least one of QoS flow identifiers associated with the DRB includes the QoS flow identifier of the packet and the DRB is associated with the PDU session of the packet, and map the packet to a default DRB associated with the PDU session of the packet if none of the established non-default DRBs is associated with the PDU session and the QoS flow identifier of the packet. Further, the UE is configured to transmit the packet over the mapped DRB.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects

The principal object of the embodiments herein is to provide a method and apparatus for managing a data communication in a next generation wireless communication system.

Another object of the embodiments herein is to receive, by a gNodeB, a plurality of packets of one or more QoS flows from a network entity.

Another object of the embodiments herein is to map, by the gNodeB, each received packet of one or more QoS flows to a DRB.

Another object of the embodiments herein is to determine, by the UE, the DRB for transmitting the packet based on the QoS flow identifier and a PDU session associated with the packet and mapping of the QoS flow identifiers to the DRBs for each established PDU session.

Another object of the embodiments herein is to receive the mapping of the QoS flow identifiers to the DRBs for each established PDU session from the gNodeB in a signaling message.

Another object of the embodiments herein is to map, by the UE, the packet to an established non-default DRB if the list of one or more QoS flow identifiers associated with the DRB includes the QoS flow identifier of the packet and the DRB is associated with the PDU session of the packet.

Another object of the embodiments herein is to map, by the UE, the packet to a default DRB associated with the PDU session of the packet if none of the established non-default DRBs is associated with the PDU session and the QoS flow identifier of the packet.

Another object of the embodiments herein is to transmit, by the UE, the packet over the mapped DRB.

BRIEF DESCRIPTION OF THE DRAWINGS

This method is illustrated in the accompanying drawings, throughout which like reference letters indicate corresponding parts in the various figures. The embodiments herein will be better understood from the following description with reference to the drawings, in which.

DETAILED DESCRIPTION

Figure 1:
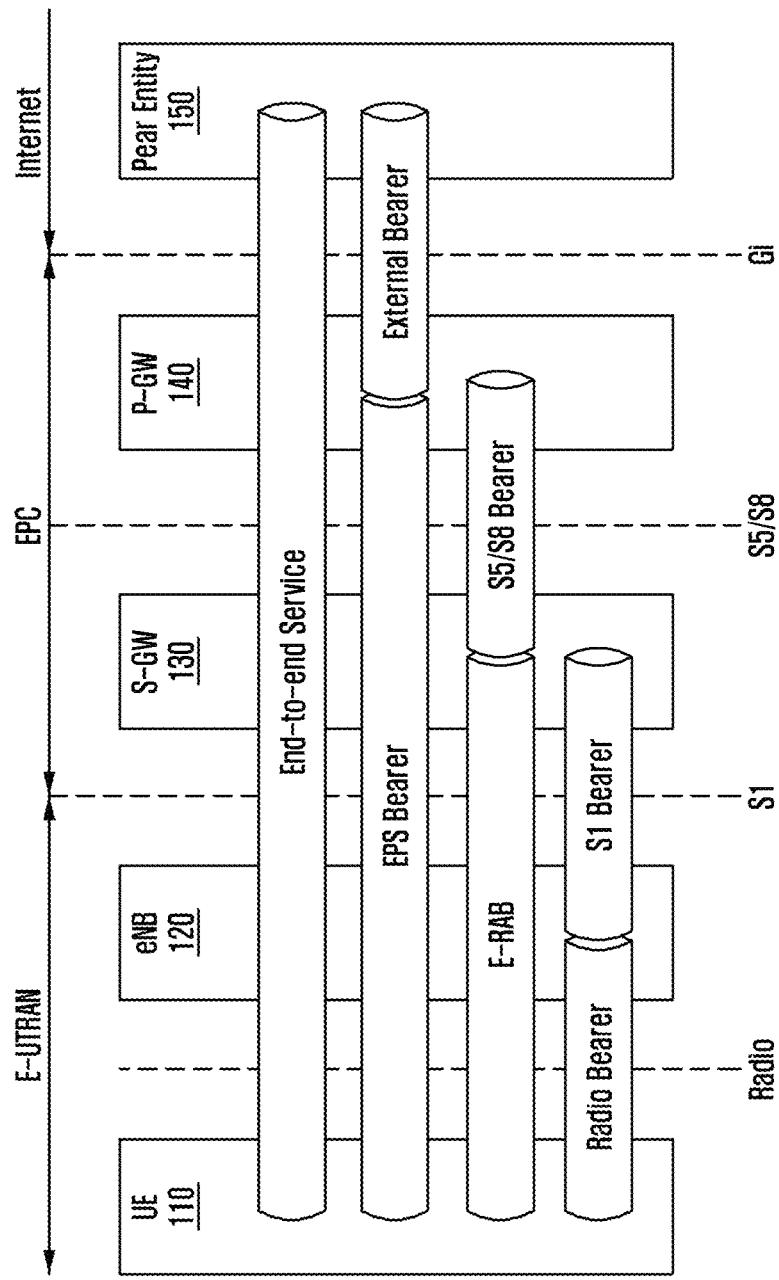
FIG. 1 illustrates an EPS bearer service architecture, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term "first" and "second" herein are used merely for labeling purpose and can be used interchangeably without departing from the scope of the embodiments. It is to be noted that terms, QoS packet markings or QoS markings or QoS ID or packet marking or QoS descriptor is used interchangeably throughout the description. It is to be noted that the QoS packet marking or the QoS marking or the QoS ID or packet marking or the flow descriptor or the QoS descriptor identifies a set of QoS parameters. The proposed method has described this disclosure using the packet marking (PM), but is equally applicable for QoS packet marking or QoS marking or QoS ID or packet marking or flow descriptor.

Accordingly, embodiments herein disclose a UE for managing a data communication in a wireless communication network. The UE includes a processor and a memory to store a DRB configuration received from a gNodeB in the wireless communication network. A DRB management unit is coupled to the memory and the processor. Further, the DRB management unit is configured to determine a DRB for transmitting the packet based on the QoS flow identifier and a PDU session associated with the packet and mapping of the QoS flow identifiers to the DRBs for each established PDU session. The DRB management unit is configured to perform one of mapping the packet to an established non-default DRB if the list of one or more QoS flow identifiers associated with the DRB includes the QoS flow identifier of the packet and the DRB is associated with the PDU session of the packet, and mapping the packet to a default DRB associated with the PDU session of the packet if none of the established non-default DRBs is associated with the PDU session and the QoS flow identifier of the packet. Further, the DRB management unit is configured to transmit the packet over the mapped DRB.

The proposed method can be used to reduce the signaling overhead and to provide more QoS granularity by eliminating the EPS bearer concept in the next generation wireless communication system (e.g., 5G wireless communication system or the like).

Unlike the conventional methods and the conventional systems, the RAN provides the mapping between the DRBs and the QoS flows. Multiple QoS flows can be mapped to same DRB. In UL, the UE maps the QoS flows to the DRBs based on mapping received from the RAN. Further, the UE receives packet in the UL from a higher layer. The UE receives the PM associated with packet along with the packet. Further, the UE maps the packet to a default DRB if the DRB does not exist for PM associated with the DRB. Further, the UE also adds the packet marking in a header of the packet sent on default DRB. Further, the UE adding packet marking in the packet header of packet is transmitted to the gNB. The gNB adding packet marking in the packet header of packet is transmitted to a CN.

In the uplink, the UE marks uplink packets over a Uu interface with the QoS flow identifier for the purposes of marking forwarded packets to the CN as described in the 3GPP standard TR 38.804 and the 3GPP standard TS 38.300.

Referring now to the drawings, and more particularly to FIGS. 2 through 14, there are shown preferred embodiments.

Figure 2:
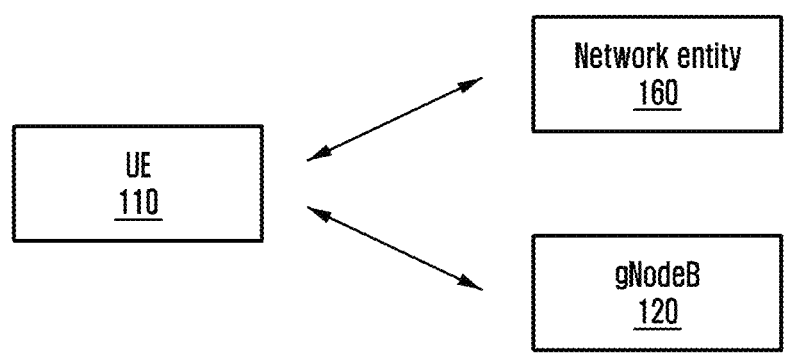
FIG. 2 is an overview of a system for managing a data communication in a wireless communication network, according to an embodiment as disclosed herein.

FIG. 2 is an overview of a system for managing a data communication in a wireless communication network, according to an embodiment as disclosed herein. In an embodiment, the system includes a UE 110, a gNodeB 120, a network entity 160. The UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The UE 110 can be, for example, but not limited to a cellular phone, a smart phone, a Personal Digital Assistant (PDA), a wireless modem, a wireless communication device, a handheld device, a tablet computer, a laptop computer, a wireless local loop (WLL) station, a Universal Serial Bus (USB) dongle, a wireless router, etc.

The gNodeB (GNB) 120 may also include or be referred to by those skilled in the art as a 5G eNB, a base station, a base transceiver station, a radio base station, an access point, a radio transceiver, an eNB or some other suitable terminology.

The next generation communication system supports a PDU Connectivity Service i.e., a service that provides exchange of PDUs between the UE 110 and a data network (DN) (not shown). The PDU connectivity service is supported via PDU sessions that are established upon request from the UE 110. The PDU session is an association between the UE 110 and the DN that provides a PDU connectivity service. Each PDU session supports a single PDU session type i.e., supports the exchange of a single type (e.g., IPv4, IPv6, Ethernet, etc.) of the PDU requested by the UE 110 at the establishment of the PDU session. The PDU sessions are established (upon UE 110 request), modified (upon UE 110 and network request) and released (upon UE 110 and network request) using a Non Access Stratum (NAS) session management signaling exchanged between the UE 110 and a Session Management Function (SMF) in a core network (CN) (not shown). In the next generation communication system, for data communication, the UE 110 may establish one or more PDU sessions, to the same DN or to different DNs. Each PDU session is identified by a PDU session identifier.

In case of non-roaming, packets of the PDU session in the uplink (UL) direction traverses from the UE 110 to a RAN (or gNodeB) 120 over a radio interface, the RAN (or gNodeB) 120 to a User Plane Function (UPF) over a N3 interface and from the UPF to the DN over a N6 interface. In case of roaming, the packets of PDU session in the UL traverses from the UE 110 to the RAN (or gNodeB) 120 over the radio interface, the RAN (or gNodeB) 120 to the UPF in a visiting PLMN over the N3 interface, the UPF in the visiting PLMN to the UPF in a home PLMN over a N9 interface and from the UPF in the home PLMN to the DN over a N6 interface. In case of non-roaming, the packets of PDU session in a downlink (DL) traverses from the DN to the UPF over the N6 interface, the UPF to the RAN (or gNodeB) 120 over a N3 interface, the RAN (or gNodeB) 120 to the UE 110. In case of roaming, the packets of the PDU session in the DL traverses from the DN to the UPF in a Home PLMN over the N6 interface, the UPF in the home PLMN to the visiting PLMN over a N9 interface, the UPF in the visiting PLMN to the RAN (or gNodeB) 120 over the N3 interface, the RAN (or gNodeB) 120 to the UE 110.

Further, the packets of the PDU session may require different QoS treatment. The QoS flow is the finest granularity of the QoS differentiation in the PDU session. The packets of the PDU session which require same QoS treatment constitute the QoS flow. There can be several QoS flows per PDU session. A QoS flow identifier (ID) (or QoS Marking or QoS ID or QoS descriptor or packet marking) is used to identify the QoS flow. The QoS Flow ID is unique within the PDU session. A user plane traffic with the same QoS Flow ID within the PDU session receives the same traffic forwarding treatment (e.g., scheduling, admission control etc.). Each QoS flow is mapped to a set of QoS parameters (e.g., Allocation and Retention Priority, guaranteed bit rate, maximum bit rate, etc.). The QoS flow identifier is included in each packet of the PDU session exchanged between the RAN (or gNodeB) 120 and the UPF. Marking of packet (i.e., associating the packet transmitted on a N3 interface to the QoS flow identifier) is done by the UPF in the DL. Marking of the packet (i.e., associating the packet transmitted on the N3 interface to the QoS flow identifier) is done by the RAN (or gNodeB) 120 in the UL. For each PDU session, the single tunnel is established between the UPF and the RAN (or gNodeB) 120 for exchanging the packets associated with different QoS flows of the PDU session.

For exchanging the packets of a PDU session, the data radio bearers (DRBs) need to be established between the UE 110 and the RAN (or gNodeB) 120. Various methods to establish the DRBs and mapping packets of QoS flows to DRBs are discussed further.

In an embodiment, the RAN (or gNodeB) 120 is configured to receive a plurality of packets of at least one QoS flow from a network entity 160 (i.e., a UPF in a core network or a UP entity in the core network). The QoS flow ID (QFI) associated with the at least one QoS flow is received in the header of each packet. Further, the RAN (or gNodeB) 120 is configured to map each received packet of the at least one QoS flow to the DRB. The at least one QoS flow is mapped to the DRB based on the QFI associated with the at least one QoS flow.

In an embodiment, the plurality of packets of the at least one QoS flow is received, by the gNodeB 120, from the network entity 160 by receiving the packet on at least one PDU tunnel between the gNodeB 120 and the network entity 160. The PDU tunnel is separate for receiving the plurality of packets of the at least one QoS flow of each PDU session.

In an embodiment, each received packet, from the network entity 160, of the at least one QoS flow is mapped, by the gNodeB 120, to the DRB by mapping the received packet to an already established DRB if the list of at least one QoS flow identifiers associated with the established DRB includes the QoS flow identifier of the received packet and the established DRB is associated with the PDU session of the received packet.

In an embodiment, each received packet, from the network entity 160, of the QoS flow is mapped, by the gNodeB 120, to the DRB by establishing a new DRB if none of the established DRBs is associated with the PDU session and the QoS flow of the received packet, transmitting a signaling message including the DRB configuration of new DRB to the UE 110, wherein the DRB configuration includes one or more of the PDU session identifier and a list of one or more QoS flow identifiers of the QoS flows associated with the DRB, and mapping the received packet to newly established DRB.

In an embodiment, each received packet, from the network entity 160, of the QoS flow is mapped to the DRB by updating configuration of an already established DRB associated with the PDU session of the received packet if none of the established DRBs for the PDU session of received packet is associated with the QoS flow of the received packet, where the QoS flow identifier of the received packet is added to the list of QoS flow identifiers of the updated DRB, transmitting the signaling message including the DRB configuration of the updated DRB to the UE 110, where the DRB configuration includes the at least one of the PDU session identifier and a list of at least one of QoS flow identifiers of the QoS flows associated with the DRB, and mapping the received packet to the updated DRB.

In an embodiment, the QoS flow is mapped to only one DRB.

In an embodiment, the DRB is mapped to the at least one QoS flow of same PDU session.

In an embodiment, each of the DRB defines a packet forwarding treatment on a radio interface to data exchange between the UE 110 and the gNodeB 120 in the wireless communication network.

In an embodiment, the RAN (or gNodeB) 120 is configured to receive the plurality of packets of the at least one QoS flow from another gNodeB. The at least one of QFI and the PDU session identifier of the PDU session associated with each packet is also received by the RAN (or gNodeB) 120 from another gNodeB. Further, the RAN (or gNodeB) 120 is configured to map each received packet of the at least one QoS flow to the DRB. The at least one QoS flow is mapped to the DRB based on the QFI associated with the at least one QoS flow. Further, the UE 110 is configured to determine the DRB for transmitting the packet based on the QoS flow identifier and the PDU session associated with the packet and mapping of the QoS flow identifiers to the DRBs for each established PDU session. Further, the UE is configured to perform one of: map the packet to the established non-default DRB if the list of at least one of QoS flow identifiers associated with the DRB includes the QoS flow identifier of the packet and the DRB is associated with the PDU session of the packet, and map the packet to the default DRB associated with the PDU session of the packet if none of the established non-default DRBs is associated with the PDU session and the QoS flow identifier of the packet. Further, the UE 110 is configured to transmit the packet over the mapped DRB.

In an embodiment, the UE 110 receives mapping of the QoS flow identifiers to the DRBs for each established PDU session from the gNodeB 120 in a signaling message.

In an embodiment, the UE 110 receives the PDU session identifier and a list of at least one of QoS flow identifiers associated with each DRB from the gNodeB 120 in the signaling message.

In an embodiment, the UE 110 receives the list of at least one of QoS flow identifiers associated with each DRB from the gNodeB 120 in the signaling message.

In an embodiment, the UE 110 receives, from the gNodeB 120, the default DRB configuration associated with the PDU session in the signaling message.

In an embodiment, the UE 110 receives from the gNodeB 120 configuration of the default DRB associated with the PDU session in the signaling message after the establishment of the RRC connection.

In an embodiment, on receiving the packet on default DRB, the gNodeB 120 is further configured to establish a new DRB for the QoS flow identifier and the PDU session identifier received in the packet header of the packet received on the default DRB. Further, the UE 110 is configured to transmit the signaling message including the DRB configuration of new DRB, where the DRB configuration includes one or more of a PDU session identifier and a list of one or more QoS flow identifiers of the QoS flows associated with the DRB.

In an embodiment, on receiving the packet on the default DRB, the gNodeB 120 is configured to establish a new DRB for the QoS flow identifier received in the packet header of the packet received on the default DRB. Further, the gNodeB 120 is configured to transmit the signaling message including the DRB configuration of new DRB. The DRB configuration includes the list of one or more QoS flow identifiers of the QoS flows associated with the DRB.

In an embodiment, on receiving the packet on the default DRB, the gNodeB 120 is further configured to update an already established DRB corresponding to the PDU session identifier received in the packet header of packet received on the default DRB. The QoS flow identifier of the packet received on the default DRB is added to the list of the QoS flow identifiers of the updated DRB. Further, the gNodeB 120 is configured to transmit the signaling message including the DRB configuration of the updated DRB, where the DRB configuration includes one or more of the PDU session identifier and a list of one or more QoS flow identifiers of the QoS Flows associated with DRB.

In an embodiment, on receiving the packet on the default DRB, the gNodeB 120 is configured to update the already established DRB. The QoS flow identifier of the packet received on the default DRB is added to the list of the QoS flow identifiers of the updated DRB. Further, the gNodeB 120 is configured to transmit the signaling message including the DRB configuration of the updated DRB. The DRB configuration includes the list of one or more QoS flow identifiers of the QoS flows associated with DRB.

The FIG. 2 shows the limited overview of the system but, it is to be understood that other embodiments are not limited thereto. Further, the system can include any number of hardware or software components communicating with each other. Further, the labels are only used for illustrative purpose and not limiting the scope of this disclosure. For example, the component can be, but not limited to, a process running in the controller or processor, an object, an executable process, a thread of execution, a program, or a computer.

Figure 3:
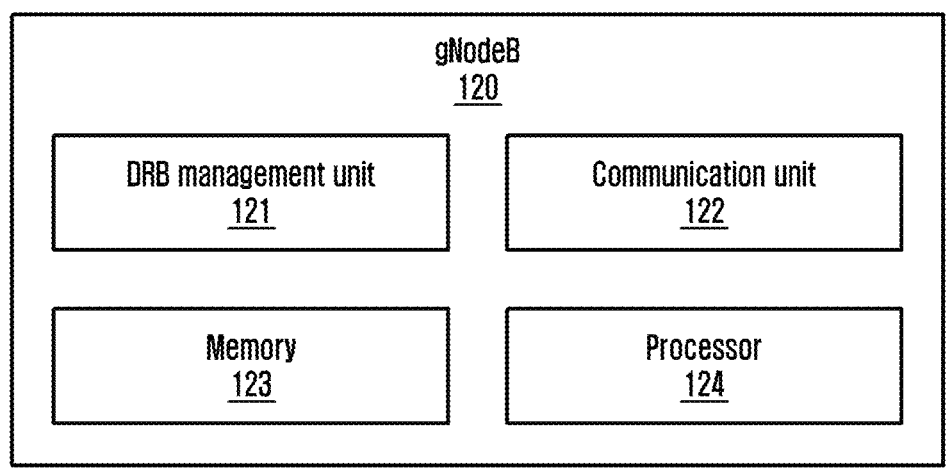
FIG. 3 illustrates various components of a gNodeB, according to an embodiment as disclosed herein.

FIG. 3 illustrates various components of the gNodeB 120, according to an embodiment as disclosed herein. In an embodiment, the gNodeB 120 includes a DRB management unit 121, a communication unit 122, a memory 123 and a processor 124. The processor 124 is in communication with the DRB management unit 121, the communication unit 122, and the memory 123. The DRB management unit 121 is coupled to the memory 123 and the processor 124. In an embodiment, the DRB management unit 121 is configured to receive the plurality of packets of at least one QoS flow from the network entity 160. (The various procedures for receiving the plurality of packets of at least one QoS flow from the network entity 160 is explained in the FIGS. 7 to 14). After receiving the plurality of packets of at least one QoS flow from the network entity 160, the DRB management unit 121 is configured to map each received packet of the at least one QoS flow to the DRB. (The various procedures for mapping each received packet of the at least one QoS flow to the DRB is explained in the FIGS. 7 to 14). In an embodiment, the DRB management unit 121 is configured to establish the DRBs and provide the DRBs to the QoS flows mapping information to the UE 110 based on the information received from the network entity 160 and/or the UE 110. (The various procedures for establishing the DRBs and provide the DRBs to the QoS flows mapping information to the UE 110 is explained in the FIGS. 7 to 14).

The communication unit 122 is configured to communicate with internal units of the gNodeB 120. Further, the communication unit 122 is configured to communicate with external units of the system.

In an embodiment, the memory 123 is configured to store the DRB configurations. The memory 123 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 123 may, in some examples, be considered a non-transitory storage medium. The term "non-transitory" may indicate that the storage medium is not embodied in a carrier wave or a propagated signal. However, the term "non-transitory" should not be interpreted that the memory 123 is non-movable. In some examples, the memory 123 can be configured to store larger amounts of information than the memory. In certain examples, a non-transitory storage medium may store data that can, over time, change (e.g., in Random Access Memory (RAM) or cache).

Although the FIG. 3 shows the hardware components of the gNodeB 120 but it is to be understood that other embodiments are not limited thereon. In other embodiments, the gNodeB 120 may include fewer or greater numbers of components. Further, the labels or names of the components are used only for illustrative purpose and does not limit the scope of this disclosure. One or more components can be combined together to perform same or substantially similar function to manage the data communication in the wireless communication network.

Figure 4:
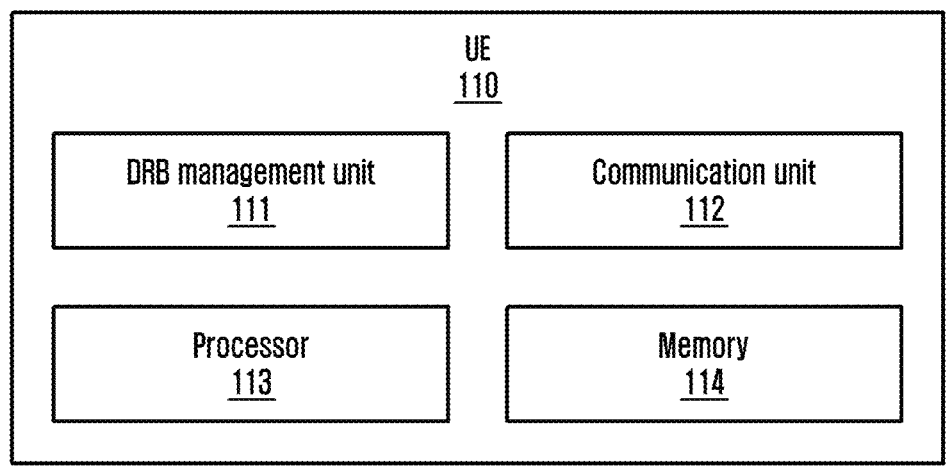
FIG. 4 illustrates various components of a UE, according to an embodiment as disclosed herein.

FIG. 4 illustrates various components of the UE 110, according to an embodiment as disclosed herein. In an embodiment, the UE 110 includes a DRB management unit 111, a communication unit 112, a memory 113 and a processor 114. The processor 114 is in communication with the DRB management unit 111, the communication unit 112, and the memory 113.

In an embodiment, the DRB management unit 111 is coupled to the memory 113 and the processor 114. Further, the DRB management unit 111 is configured to determine the DRB for transmitting the packet based on the QoS flow identifier and the PDU session associated with the packet and mapping of the QoS flow identifiers to the DRBs for each established PDU session. Further, the DRB management unit 111 is configured to perform one of: map the packet to an established non-default DRB if the list of at least one of QoS flow identifiers associated with the DRB includes the QoS flow identifier of the packet and the DRB is associated with the PDU session of the packet, and map the packet to the default DRB associated with the PDU session of the packet if none of the established non-default DRBs is associated with the PDU session and the QoS flow identifier of the packet. Further, the DRB management unit 111 is configured to transmit the packet over the mapped DRB.

Further, the communication unit 112 is configured to communicate with internal units of the UE 110. Further, the communication unit 112 is configured to communicate with external units of the system.

In an embodiment, the memory 113 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 113 may, in some examples, be considered a non-transitory storage medium. The term "non-transitory" may indicate that the storage medium is not embodied in a carrier wave or a propagated signal. However, the term "non-transitory" should not be interpreted that the memory 113 is non-movable. In some examples, the memory 113 can be configured to store larger amounts of information than the memory. In certain examples, a non-transitory storage medium may store data that can, over time, change (e.g., in Random Access Memory (RAM) or cache).

Although the FIG. 4 shows the hardware components of the UE 110 but it is to be understood that other embodiments are not limited thereon. In other embodiments, the UE 110 may include fewer or greater numbers of components. Further, the labels or names of the components are used only for illustrative purpose and does not limit the scope of this disclosure. One or more components can be combined together to perform same or substantially similar function to manage the data communication in the wireless communication network.

Figure 5:
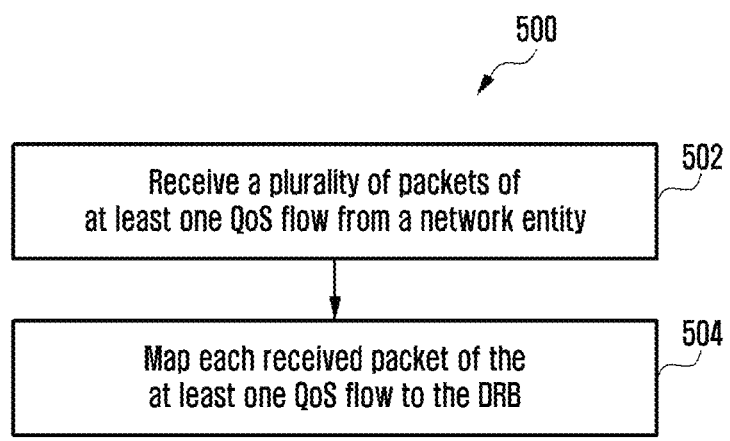
FIG. 5 is a flow diagram illustrating a method for managing, by the gNodeB, a data communication in the wireless communication network, according to an embodiment as disclosed herein.

FIG. 5 is a flow diagram 500 illustrating a method for managing, by the gNodeB 120, the data communication in the wireless communication network, according to an embodiment as disclosed herein. The operations of the 502 and 504 are performed by the DRB management unit 121.

At 502, the method includes receiving the plurality of packets of at least one QoS flow from the network entity 160. The identifier associated with the at least one QoS flow is included in the header of each packet by the network entity 160. The plurality of packets of at least one QoS flow of the at least one PDU session are received from the network entity 160 over at least one tunnel established between the gNodeB 120 and the network entity 160. The tunnel established between the gNodeB 120 and the network entity 160 is per PDU session. In an embodiment, the plurality of packets of the at least one QoS flow is received from another gNodeB. The at least one of QFI and the PDU session identifier of the PDU session associated with each packet is also received from another gNodeB. At 504, the method includes mapping each received packet of the at least one QoS flow of the PDU session to the DRB. The at least one QoS flow of the PDU session is mapped to the DRB based on the ID associated with the at least one QoS flow.

The received packet of the at least one QoS flow is mapped to the already established DRB if the list of at least one QoS flow identifiers associated with the established DRB including the QoS flow identifier of the received packet and the established DRB is associated with the PDU session of the received packet.

The received packet of the at least one QoS flow is mapped to the DRB by establishing the new DRB if none of the established DRBs is associated with the PDU session and the QoS flow of the received packet, transmitting the signaling message including the DRB configuration of new DRB to the UE 110, wherein the DRB configuration includes one or more of the PDU session identifier and the list of one or more QoS flow identifiers of the QoS flows associated with the DRB, and mapping the received packet to newly established DRB.

The received packet of the at least one QoS flow is mapped to the DRB by updating configuration of an already established DRB associated with the PDU session of the received packet if none of the established DRBs for the PDU session of received packet is associated with the QoS flow of the received packet, where the QoS flow identifier of the received packet is added to the list of QoS flow identifiers of the updated DRB, transmitting the signaling message including the DRB configuration of the updated DRB to the UE 110, where the DRB configuration includes the at least one of the PDU session identifier and the list of at least one of QoS flow identifiers of the QoS flows associated with the DRB, and mapping the received packet to the updated DRB.

Each QoS flow is mapped to only one DRB. Each DRB is mapped to the at least one QoS flow of same PDU session.

In an embodiment, mapping each received packet of the at least one QoS flow of the PDU session to the DRB includes establishing a new DRB if none of the established DRBs is associated with the PDU session and the QoS flow of the received packet, transmitting the signaling message including the DRB configuration of new DRB to the UE 110, wherein the DRB configuration includes one or more of the PDU session identifier and a list of one or more QoS flow identifiers of the QoS flows associated with the DRB, and mapping the received packet to newly established DRB.

In an embodiment, mapping each received packet of the at least one QoS flow of the PDU session to the DRB includes updating configuration of an already established DRB associated with the PDU session of the received packet if none of the established DRBs for the PDU session of received packet is associated with the QoS flow of the received packet wherein the QoS flow identifier of the received packet is added to the list of QoS flow identifiers of the updated DRB, transmitting the signaling message including the DRB configuration of the updated DRB to the UE 110 where the DRB configuration includes the at least one of the PDU session identifier and the list of at least one of QoS flow identifiers of the QoS flows associated with the DRB, and mapping the received packet to the updated DRB.

Figure 6:
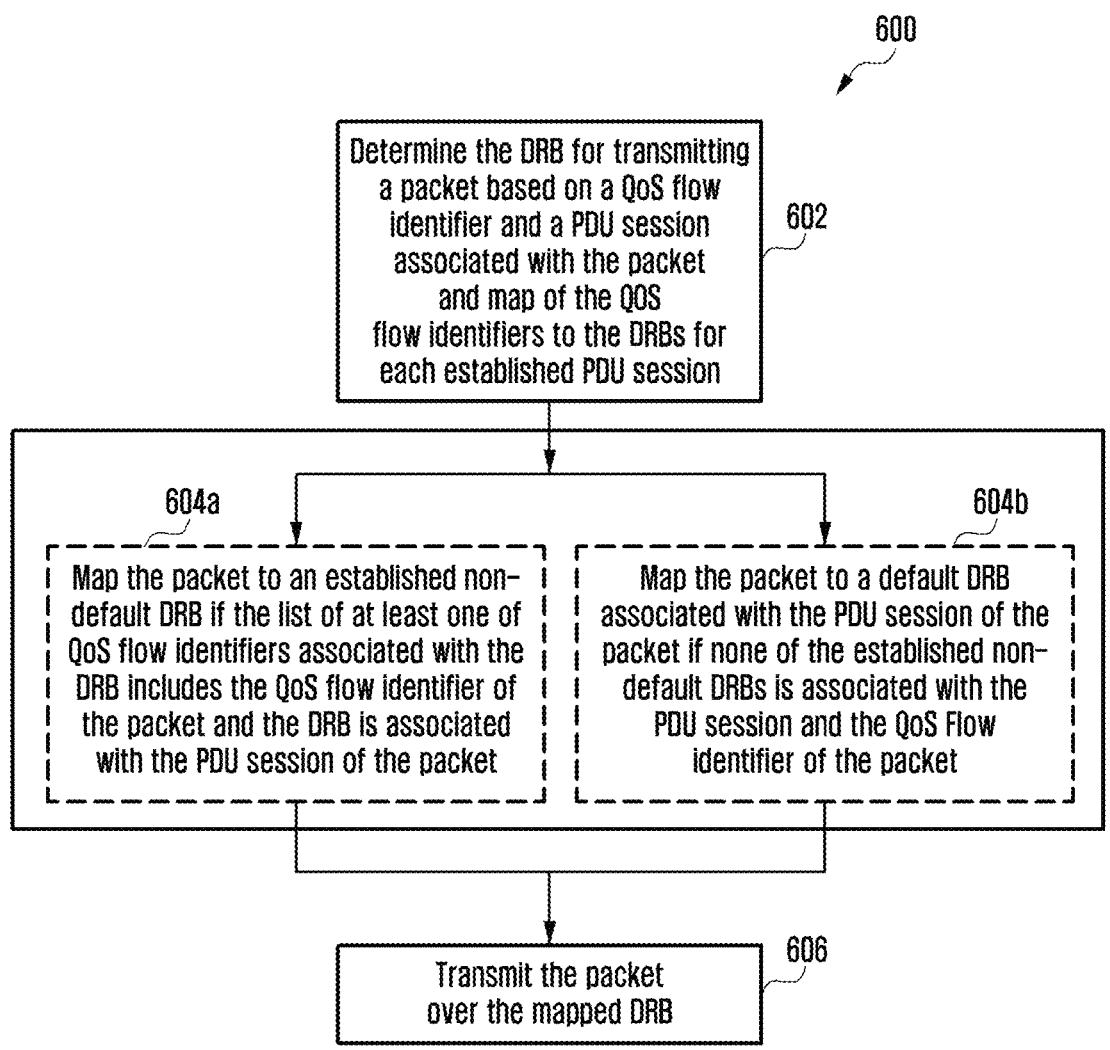
FIG. 6 is a flow diagram illustrating a method for managing, by the UE, the data communication in the wireless communication network, according to an embodiment as disclosed herein.

FIG. 6 is a flow diagram 600 illustrating a method for managing, by the UE 110, the data communication in the wireless communication network, according to an embodiment as disclosed herein. The operations of the 602, 604a, 604b and 606 are performed by the DRB management unit 111.

At 602, the method includes determining the DRB for transmitting the packet based on the QoS flow identifier and the PDU session associated with the packet and mapping of the QoS flow identifiers to the DRBs for each established PDU session. At 604a, the method includes mapping the packet to an established non-default DRB if the list of at least one of QoS flow identifiers associated with the DRB includes the QoS flow identifier of the packet and the DRB is associated with the PDU session of the packet. At 604b, the method includes mapping the packet to the default DRB associated with the PDU session of the packet if none of the established non-default DRBs is associated with the PDU session and the QoS flow identifier of the packet. At 606, the method includes transmitting the packet over the mapped DRB.

In an embodiment, the UE 110 receives mapping of the QoS flow identifiers to the DRBs for each established PDU session from the gNodeB 120 in the signaling message (e.g., RRC signaling message).

In an embodiment, the UE 110 receives the PDU session identifier and the list of at least one of QoS flow identifiers associated with each DRB from the gNodeB 120 in the signaling message.

In an embodiment, the UE 110 receives the list of at least one of QoS flow identifiers associated with each DRB from the gNodeB 120 in the signaling message.

In an embodiment, the UE 110 receives the default DRB configuration associated with the PDU session in the RRC signaling message.

In an embodiment, the UE 110 includes at least one of the QoS flow identifier and the PDU session identifier in the packet header of the packet transmitted on the default DRB.

The various actions, acts, blocks, steps, or the like in the flow diagrams 500 and 600 may be performed in the order presented, in a different order or simultaneously. Further, in some embodiments, some of the actions, acts, blocks, steps, or the like may be omitted, added, modified, skipped, or the like without departing from the scope of this disclosure.

Figure 7:
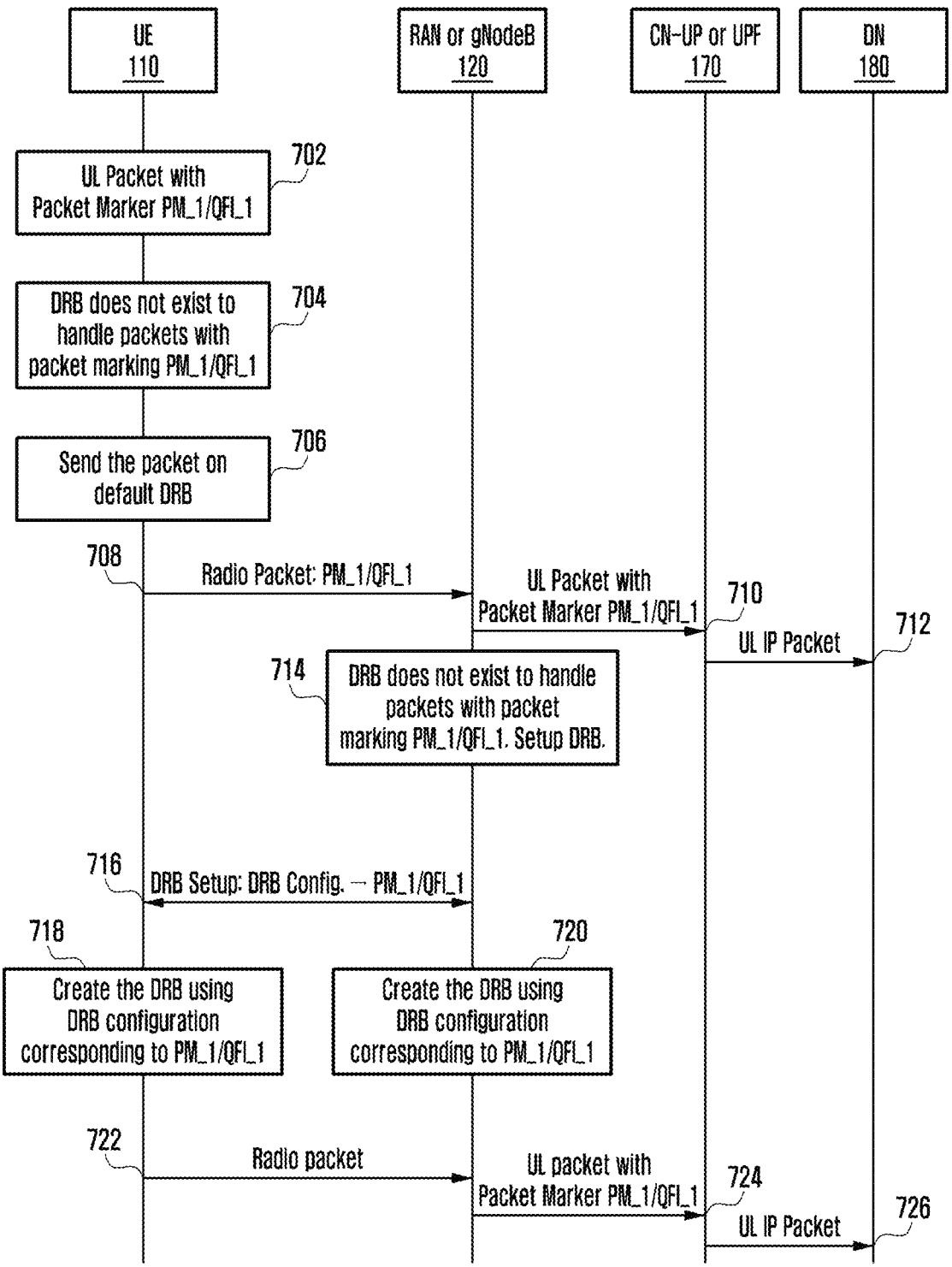
FIG. 7 is a sequence diagram illustrating various operations performed for establishing a data radio bearer and mapping packets to the DRBs in an uplink (UL), according to an embodiment as disclosed herein.

FIG. 7 is a sequence diagram illustrating various operations performed for establishing the DRBs and mapping the UL packets to the DRBs, according to an embodiment as disclosed herein.

In an embodiment, the QoS parameters associated with the QoS flow are provided to the RAN (or gNodeB) 120 as the QoS profile when the PDU session is established or the new QoS flow is established or the radio connection is established. The QoS parameters may also be pre-configured in the RAN 120. In the RAN 120, the DRB defines the packet treatment on the radio interface (i.e., Uu interface). The DRB serves packets with the same packet forwarding treatment. The separate DRBs may be established for the QoS flows requiring different packet forwarding treatment. The RAN (or gNodeB) 120 knows the mapping between each QoS Flow and associated QoS parameters (or QoS profile) and accordingly decides the radio configuration for corresponding DRB. In the DL, the RAN (or gNodeB) 120 maps QoS flows to the DRBs based on the packet marking (i.e., QoS Flow ID) and the associated QoS profiles. For the UL, the RAN (or gNodeB) 120 provides the QoS flow to the DRB mapping in the RRC signaling message. This mapping information is used by UE 110 to map the packet to be transmitted to one of the established DRBs. One DRB can be mapped to multiple QoS flows. For each DRB configured, the RAN (or gNodeB) 120 provides the list of one or more QoS Flow Identifiers (QFIs) and PDU session identifier. In a system in which only one PDU session can be established for each UE 110, the RAN (or gNodeB) 120 may not provide the PDU session identifier for each configured DRB. The QoS parameters (e.g., packet error rate, latency, data rate, etc.) which are related to the radio level QoS can be same for multiple QoS flows and hence multiple QoS flows of same PDU session can be mapped to same DRB. The QoS flow of the PDU session is not mapped to more than one DRB. The QoS flow of one PDU session and another QoS flow of another PDU session may have same QoS Flow ID but these are mapped to different DRBs. In other words, the QoS flows of different PDU sessions are not mapped to same DRB. If the QoS flows of different PDU sessions are mapped to same DRB, then on receiving the packet from the UE 110 on this DRB, the gNodeB 120 cannot identify the PDU session associated with this packet and hence it will not be able to identify the tunnel on which this packet should be sent to the UPF 170. Note that, the tunnel between gNodeB 120 and UPF 170 is different for each PDU session.

In the proposed method, the RAN (or gNodeB) 120 first establishes one or more DRBs and provides the configuration of each established DRB to the UE 110 in the RRC signaling message after the RRC connection is established between the UE 110 and the RAN (or gNodeB) 120. Each established DRB is either a default DRB associated with the PDU session or a non-default DRB associated with the PDU session. One default DRB is established for each PDU session. Multiple non-default DRBs can be associated with the PDU session. For each non-default DRB, the list of one or more QoS flow identifiers is provided by the gNodeB 120. In the DRB configuration included in the RRC signaling, the RAN (or gNodeB) 120 may indicate whether it is the default DRB or not.

In the UL, the access stratum (i.e., AS) in the UE 110 receives (702) the packet to be transmitted and associated PM/QFI and the PDU session identifier from the higher layer (e.g., NAS layer or application layer in the UE 110). In a system in which only one PDU session can be established for each UE 110, the access stratum (i.e., AS) in the UE 110 receives the packet to be transmitted and associated PM/QFI from the higher layer (e.g., NAS layer or application layer in the UE 110).

In the proposed method, the UE 110 checks (704) if the DRB is already established at least for the QoS flow (identified by PM/QFI) and the PDU session associated with received packet or not. If yes, then the UE 110 maps the packet to that DRB and transmits the packet over the mapped DRB. If not, then the UE 110 maps the packet to the default DRB of the PDU session associated with the packet and transmits (706) the packet using the default DRB of the PDU session associated with the packet.

Further, the UE 110 sends (708) the packet over the radio along with associated PM/QFI (i.e., PM_1/QFI_1) to the RAN (or gNodeB) 120.

The PM/QFI is included in the packet sent on the default DRB. The PM/QFI can be included in the packet header (e.g., it can be included in header of the Service Data Adaptation Protocol (SDAP)).

The RAN (or gNodeB) 120 sends (710) the UL packet with the packet marker PM_1/QFI_1 to the UPF 170. The UPF 170 sends (712) the UL IP packet to the DN 180. Further, the 110 RAN (or gNodeB) 120 determines (714) to establish the DRB setup if the DRB does not exist to handle packets with the packet marking PM_1/QFI_1.

On receiving the packet on the default DRB with the PM/QFI, the RAN (or gNodeB) 120 may add the QoS flow identified by the PM/QFI to existing (i.e., already established) DRB or add a new DRB for this QoS flow identified by the PM/QFI. The RAN (or gNodeB) 120 sends (716) the updated DRB configuration to the UE 110. If new DRB is added then the UE 110 creates (718) the new DRB corresponding to new configuration and PM/QFI included in the DRB configuration message. In response, the UE 110 may send the DRB configuration complete message. After receiving the DRB configuration complete message the RAN (or gNodeB) 120 creates (720) the DRB using the DRB configuration if new DRB configuration is added for the PM/QFI.

On receiving the packet from the UE 110 on the DRB, the RAN (or gNodeB) 120 identifies the PM/QFI and PDU session identifier of the received packet based on mapping between the DRB to the PM/QFI and the PDU session identifier. The RAN (or gNodeB) 120 indicates (710 or 724) the PM/QFI of the packet to UPF 170 by adding PM/QFI in the header while transmitting the packet to UPF 170. The packet is transmitted to UPF 170 on the tunnel associated with the PDU session of the packet. The UPF 170 sends (726) the UL IP packet to the DN 180.

In an embodiment, the packets on the default DRB may be transmitted on first come first basis or can be prioritize based on the QoS marking.

In an embodiment, the PM/QFI and the PDU session identifier may be included in the BSR. This is shown in the FIG. 9. On receiving the PM/QFI and the PDU session identifier in the BSR, if there does not exist the DRB for this PM/QFI and PDU session identifier then the RAN (or gNodeB) 120 initiates DRB setup. The RAN (or gNodeB) 120 may map the PM/QFI to existing DRB or add the new DRB for this PM/QFI and PDU session identifier. The RAN (or gNodeB) 120 sends the updated DRB configuration to the UE 110. If new DRB is added, the UE 110 creates the new DRB corresponding to new configuration and PM/QFI included in the DRB configuration message. In response, the UE 110 may send DRB configuration complete message. After receiving the DRB configuration complete message, the RAN (or gNodeB) 120 creates the DRB using the DRB configuration if new DRB configuration is added for the PM/QFI.

In one embodiment of the proposed method, instead of sending the packet on the default DRB, the UE 110 can create the new DRB and configure it using the default configuration. The default configuration can be pre-defined or provided by the RAN (or gNodeB) 120 in the RRC message. Further, the UE 110 uses an unused LCID for this new DRB. The PM/QFI and optionally PDU session identifier can included in packet transmitted over this new DRB. On receiving the packet for the LCID and/or PM/QFI and/or PDU session identifier for which there is no associated DRB, the RAN (or gNodeB) 120 may map the PM/QFI to existing DRB or add the new DRB for this PM/QFI. Further, the RAN (or gNodeB) 120 sends the updated DRB configuration to the UE 110. If new DRB is added, the UE 110 updates/creates the new DRB corresponding to new configuration and PM/QFI included in the DRB configuration message. In response, the UE 110 may send DRB configuration complete message. After receiving the DRB configuration complete message, the RAN (or gNodeB) 120 creates the DRB using the DRB configuration if new DRB configuration is added for the PM/QFI.

Figure 8:
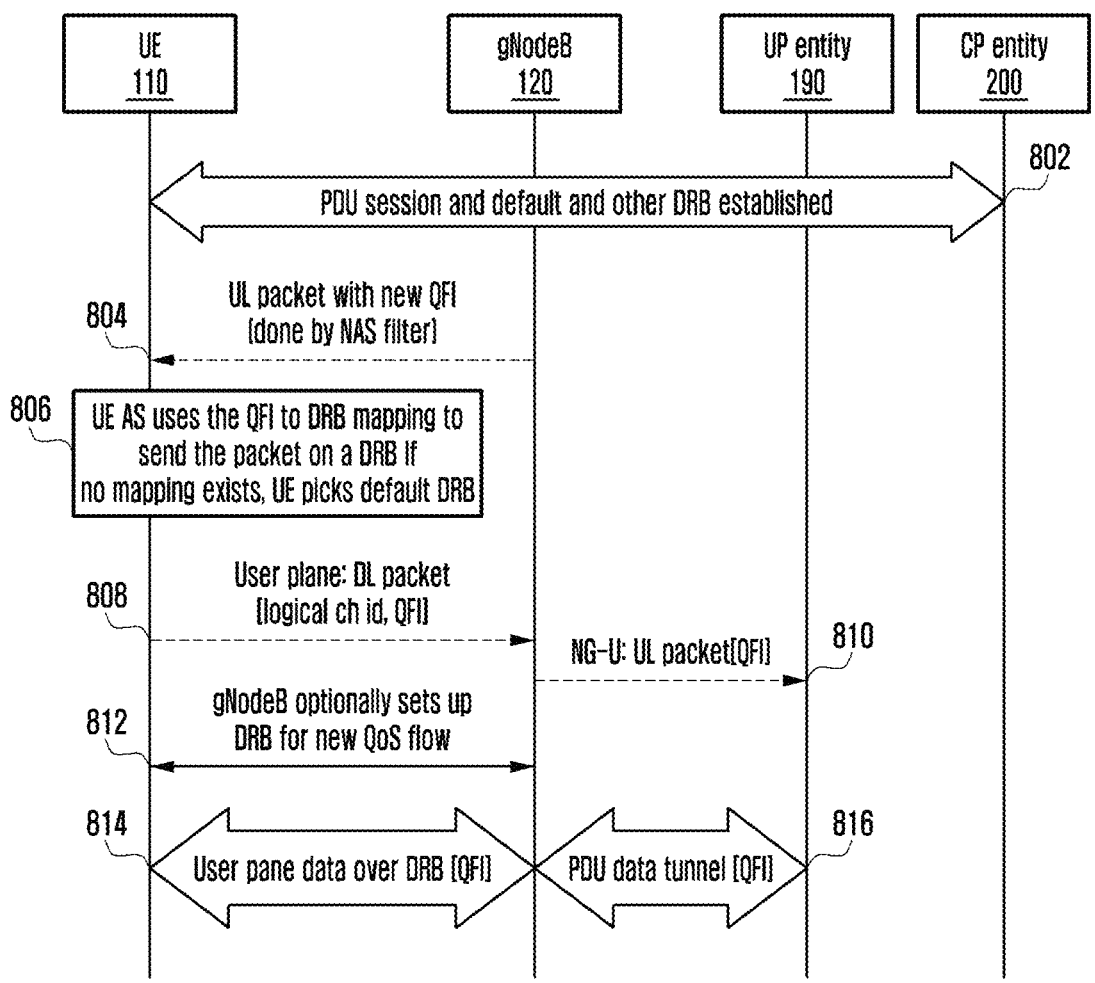
FIG. 8 is a sequence diagram illustrating various operations for establishing the data radio bearer and mapping packets of QoS flows to DRBs, according to an embodiment as disclosed herein.

As shown in the FIG. 8, the PDU session and the DRBs (including the default DRB) are established (802) among the UE 110, the gNodeB 120, an UP entity 190 and a CP entity 200. The UE AS receives (804) the packet with a new QFI from UE NAS. Further, the UE 110 uses (806) the QFI of the packet to map the packet to the DRB. If there is no mapping of the QFI to the DRB in the AS mapping table for this PDU session, then the packet is assigned to the default DRB for this PDU session.

Further, the UE 110 sends (808) the packet on the default DRB. The UE 110 includes the QFI in the SDAP header if SDAP has been configured for this DRB. SDAP entity is created for each PDU session.

Further, the gNodeB 120 sends (810) the UL packets over NG-U and includes the corresponding QFI.

Further, the gNodeB 120 optionally sets up (812) the DRB for new QoS flow. The user pane data is exchanged (814) between the UE 110 and the gNodeB 120 over radio interface and QFI may be included in the packet header. The user pane data is exchanged (814) between the gNodeB 120 and the UP entity 190 over the PDU tunnel and the QFI is included in the packet header.

Figure 9:
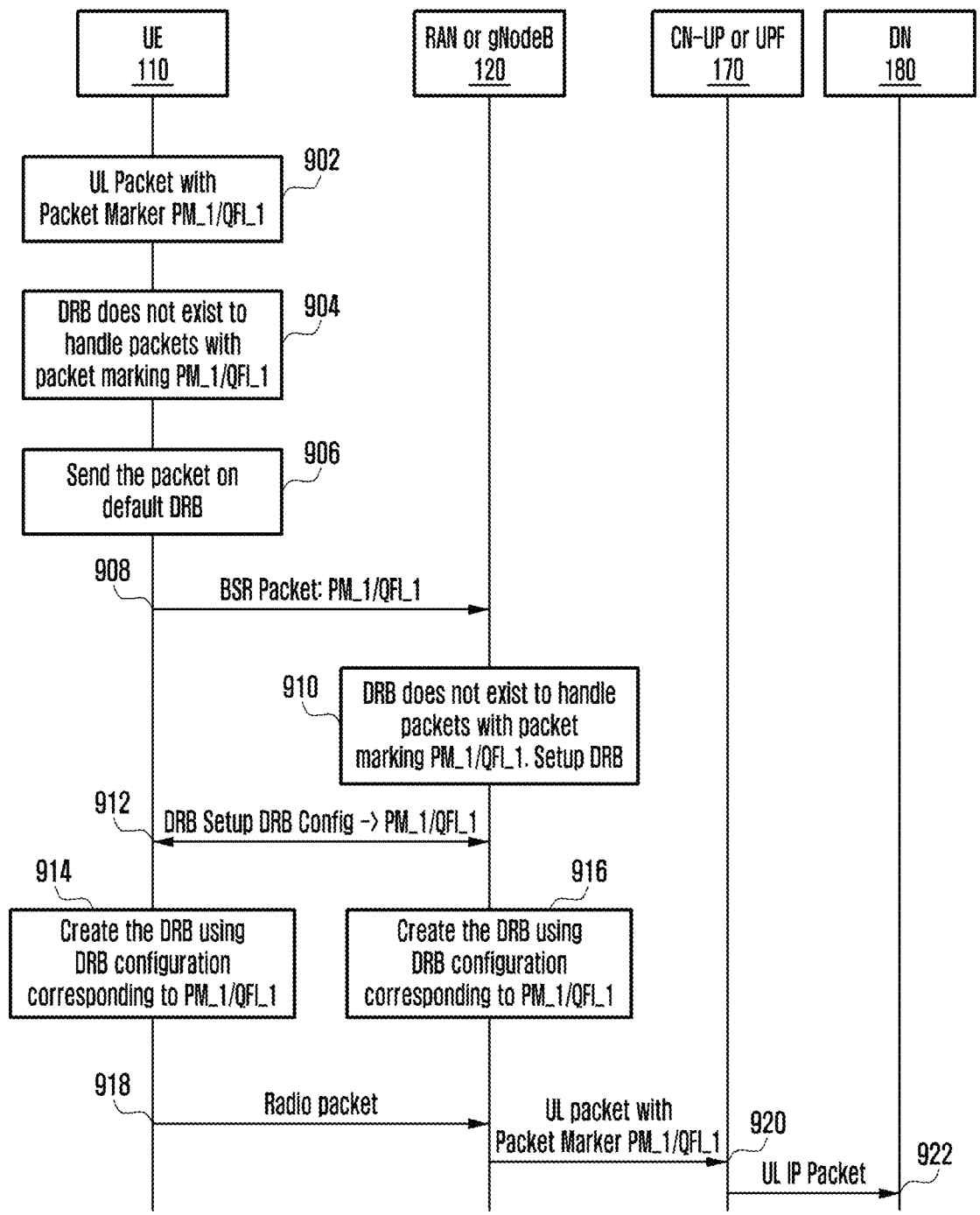
FIG. 9 is a sequence diagram illustrating various operations performed for establishing the data radio bearer in the UL, where the PM/QFI and PDU session identifier is included in a BSR, according to an embodiment as disclosed herein.

As shown in the FIG. 9, the UE 110 receives (902) the UL packet with packet marker PM_1/QFI_1 for the PDU session. Further, the UE 110 determines (904) that the DRB does not exist to handle packets with packet marking PM_1/QFI_1. Further, the UE 110 sends (906) the packet on the default DRB.

Further, the UE 110 sends (908) the BSR: PM_1/QFI_1 to the RAN (or gNodeB) 120. Further, the RAN (or gNodeB) 120 determines that the DRB does not exist to handle packets with the packet marking PM_1/QFI_1 then the RAN (or gNodeB) 120 setups (910) the DRB. The DRB Setup includes (912) DRB Config→PM_1/QFI_1. Further, the UE 110 creates (914) the DRB using the DRB configuration corresponding to PM_1/QFI_1 and the RAN (or gNodeB) 120 creates (916) the DRB using DRB configuration corresponding to PM_1/QFI_1. The UE 110 sends (918) the radio packet to the RAN (or gNodeB) 120. The RAN (or gNodeB) 120 sends (920) the UL packet with packet marker PM_1/QFI_1 to the UPF 170. Further, the UPF 170 sends (922) the UL IP packet to the DN 180.

Figure 10:
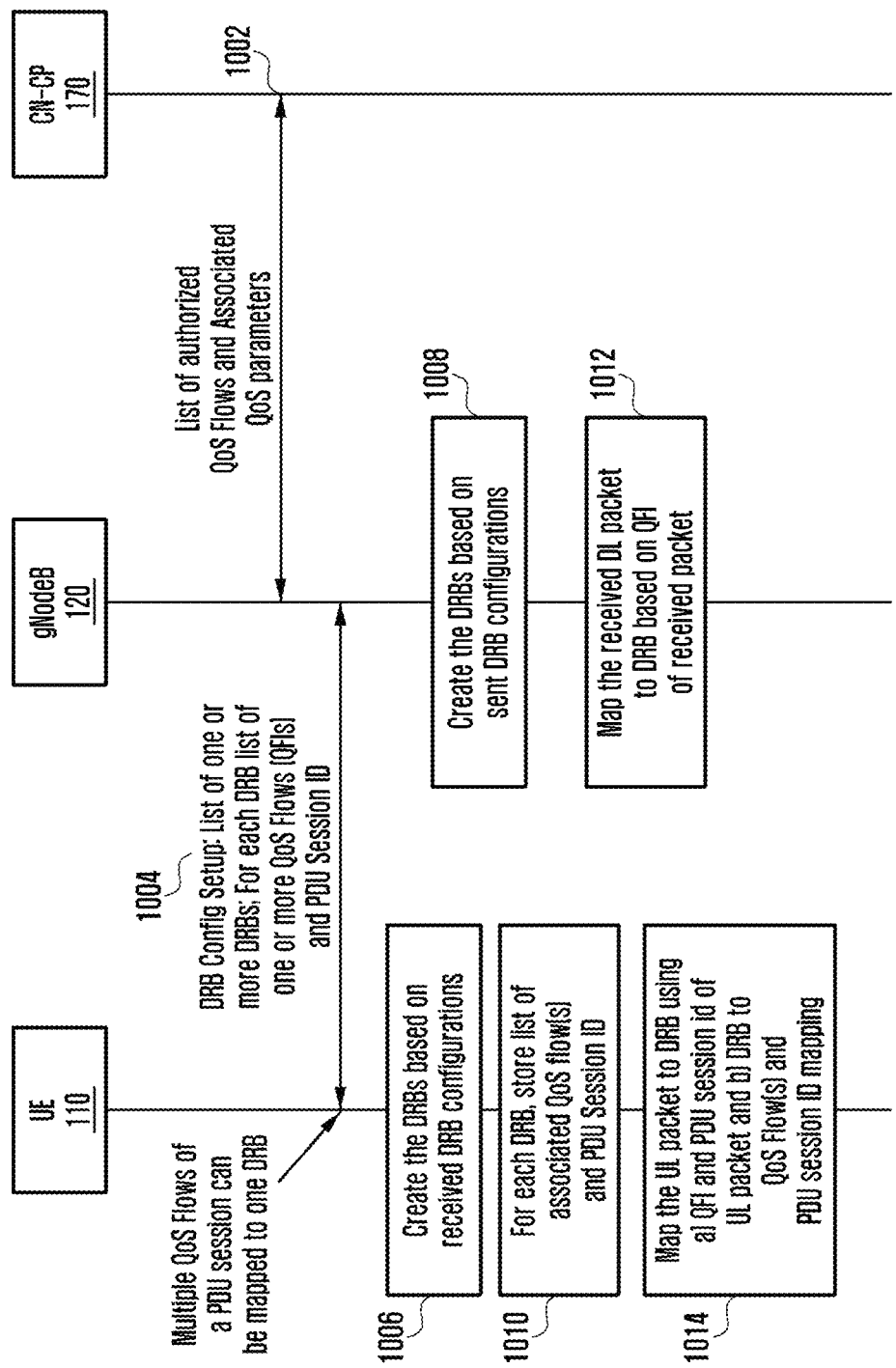
FIG. 10 is a sequence diagram illustrating various operations performed for establishing one or more DRBs, according to an embodiment as disclosed herein.

FIG. 10 is a sequence diagram illustrating various operations performed for establishing one or more DRBs and mapping the packets of QoS flows to DRBs, according to an embodiment as disclosed herein.

In an embodiment, the RAN (or gNodeB) 120 obtains the list of authorized QoS flows (identified by packet markings i.e., PM or QoS marking or QoS ID or QoS rule or flow descriptor or QoS descriptor or QoS Flow ID (QFI)) for the UE 110. The RAN (or gNodeB) 120 may obtain the authorized list of PMs/QFIs for the UE 110 from the CP function in the CN after the RAN 120 receives the RRC connection request from the UE 110. Alternately, the UE 110 may send authorized the list of PMs/QFIs to the RAN (or gNodeB) 120. Further, the UE 110 may be pre-configured with the list of authorized PMs/QFIs or the UE 110 may obtain the list of authorized PMs/QFIs from the CP function in the CN.

The QoS parameters of the QoS flow are also provided to the RAN (or gNodeB) 120 as the QoS profile when the PDU session is established or the new QoS flow is established or when the radio connection is established. The QoS parameters may also be pre-configured in the RAN. In the RAN 120, the DRB defines the packet treatment on the radio interface (i.e., Uu). The DRB serves the packets with the same packet forwarding treatment. Separate DRBs may be established for the QoS flows requiring different packet forwarding treatment. The RAN (or gNodeB) 120 knows the mapping between each QoS Flow and associated QoS parameters (or QoS profile) and accordingly decides the radio configuration for corresponding data radio bearer. In the downlink, the RAN (or gNodeB) 120 maps the QoS flows to the DRBs based on the packet marking (i.e., QoS Flow ID) and the associated QoS profiles. For the uplink, the RAN (or gNodeB) provides QoS flow to the DRB mapping in the RRC signaling message. One DRB can be mapped to multiple QoS flows. For each DRB configured, the RAN (or gNodeB) 120 provides the list of one or more QFIs and PDU session identifier. In a system in which only one PDU session can be established for each UE 110, the RAN (or gNodeB) 120 may not provide the PDU session identifier for each configured DRB. The QoS parameters (e.g., packet error rate, latency, data rate, etc.) which are related to the radio level QoS can be same for multiple QoS flows and hence multiple QoS flows of same PDU session can be mapped to same DRB. The QoS flow of the PDU session is not mapped to more than one DRB. The QoS flow of one PDU session and another QoS flow of another PDU session may have same QoS flow identifier but these are mapped to different DRBs.

In other words, the QoS flows of different PDU sessions are not mapped to same DRB. If the QoS flows of different PDU sessions are mapped to same DRB, then on receiving the packet from the UE 110 on the DRB, the gNB 120 cannot identify the PDU session associated with this packet and hence the gNB 120 will not be able to identify the tunnel on which this packet should be sent to the UPF. Note that, the tunnel is different for each PDU session.

In an embodiment, the RAN (or gNodeB) 120 provides one or more DRB configurations to the UE 110 in the RRC signaling message (e.g., RRC connection reconfiguration message). The DRB configuration includes L2 configuration similar to the DRB configuration in the existing system. For example, the DRB configuration may include Service Data Adaptation Protocol (SDAP) configuration, Packet Data Convergence Protocol (PDCP) configuration, Radio Link Control (RLC) configuration, MAC configurations, etc. Each DRB configuration is mapped to one or more PM/QFIs. For each DRB configured, the RAN (or gNodeB) 120 provides the list of one or more QFIs and PDU session identifier. The RAN (or gNodeB) 120 also indicates whether the DRB corresponding to each DRB configuration is an UL DRB or DL DRB or bidirectional DRB. The UE 110 and the RAN (or gNodeB) 120 create one DRB for each DRB configuration irrespective of whether one or more QoS flows are mapped to same DRB configuration. The created DRB is associated with one or more QoS flows listed in the DRB configuration. The DRB handles the packets of one or more PM/QFIs associated with the DRB.

In embodiment, the RAN (or gNodeB) 120 provides one or more DRB configurations to the UE 110 in the RRC signaling message (e.g., RRC connection reconfiguration message). Each DRB configuration is mapped to one or more PM/QFIs. The RAN (or gNodeB) 120 also indicates whether the DRB corresponding to each data DRB configuration is the UL DRB or the DL DRB or the bidirectional DRB. The UE 110 and the RAN (or gNodeB) 120 creates one DRB for each DRB configuration. However, if the DRB configuration is mapped to multiple PM/QFIs then the UE 110 creates separate data DRB for each PM/QFI using the same DRB configuration. So basically, in this embodiment mapping of one DRB configuration to multiple PM/QFIs means that the DRB for these PM/QFIs have same configuration but the packets of these PM/QFIs are mapped to different DRB and hence different queues. The created DRB is associated with one PM/QFI. The DRB handles the packets of QoS flow (identified by PM/QFI) associated with the DRB.

In the UL, an Access Stratum (i.e., AS) layer in the UE 110 receives the packet to be transmitted and associated PM/QFI and the PDU session identifier (needed only when multiple PDU sessions are established for the UE 110) from the higher layer (e.g., NAS layer or application layer). Based on a) PM/QFI and optionally PDU session id of the packet and b) mapping between the DRB to the PMs/QFIs and optionally the PDU session identifier, the UE 110 maps the packet to appropriate DRB. On receiving the packet from the UE 110 on the DRB, the RAN (or gNodeB) 120 identifies the PM/QFI and optionally the PDU session identifier of the received packet based on mapping between the DRB to the PM/QFI and optionally the PDU session identifier. The RAN (or gNodeB) 120 indicates the PM/QFI of the packet to the UPF 170 by adding PM/QFI in the header while transmitting the packet to UPF 170. The packet is transmitted to the UPF 170 on the tunnel associated with the PDU session of the packet.

Further, the RAN (or gNodeB) 120 may provide updated DRB configurations to the UE 110 in the RRC signaling message whenever the PM/QFIs authorized for the UE changes (or new QoS flow is added or existing QoS flow is released).

In one embodiment, the DRB configurations can be provided by the RAN (or gNodeB) 120. The mapping between the PM/QFIs, the PDU session identifier and the DRB configurations can be provided to the UE 110 by the CP function in the CN.

In one embodiment, in addition to PM/QFI, a priority may also be associated with the packet. Within same DRB, the packets can be treated differently for different priority. The packets can be transmitted in order of priority. The packet queue of the DRB can be managed as priority queue. Alternately, multiple queues can be maintained for packets with different priority.

As shown in the FIG. 10, the list of authorized QoS flows and associated QoS parameters are provided (1002) between the gNodeB 120 and the CN-CP entity. Further, the DRB Config setup including the list of one or more DRBs; for each DRB list of one or more QoS Flows (QFIs) and PDU Session ID is provided (1004) between the UE 110 and the gNodeB 120. Further, the UE 110 creates (1006) the DRBs based on the received DRB configurations. The gNodeB 120 creates (1008) the DRBs based on sent DRB configurations. For each DRB, the UE 110 stores (1010) the list of associated QoS flow(s) and the optionally the PDU Session ID. Further, the gNB 120 maps (1012) the received DL packet to DRB based on the QFI of received packet. Further, the UE 110 maps (1014) the UL packet to the DRB using a) QFI and optionally PDU session id of UL packet and b) DRB to QoS Flow(s) and optionally PDU session identifier mapping.

Figure 11:
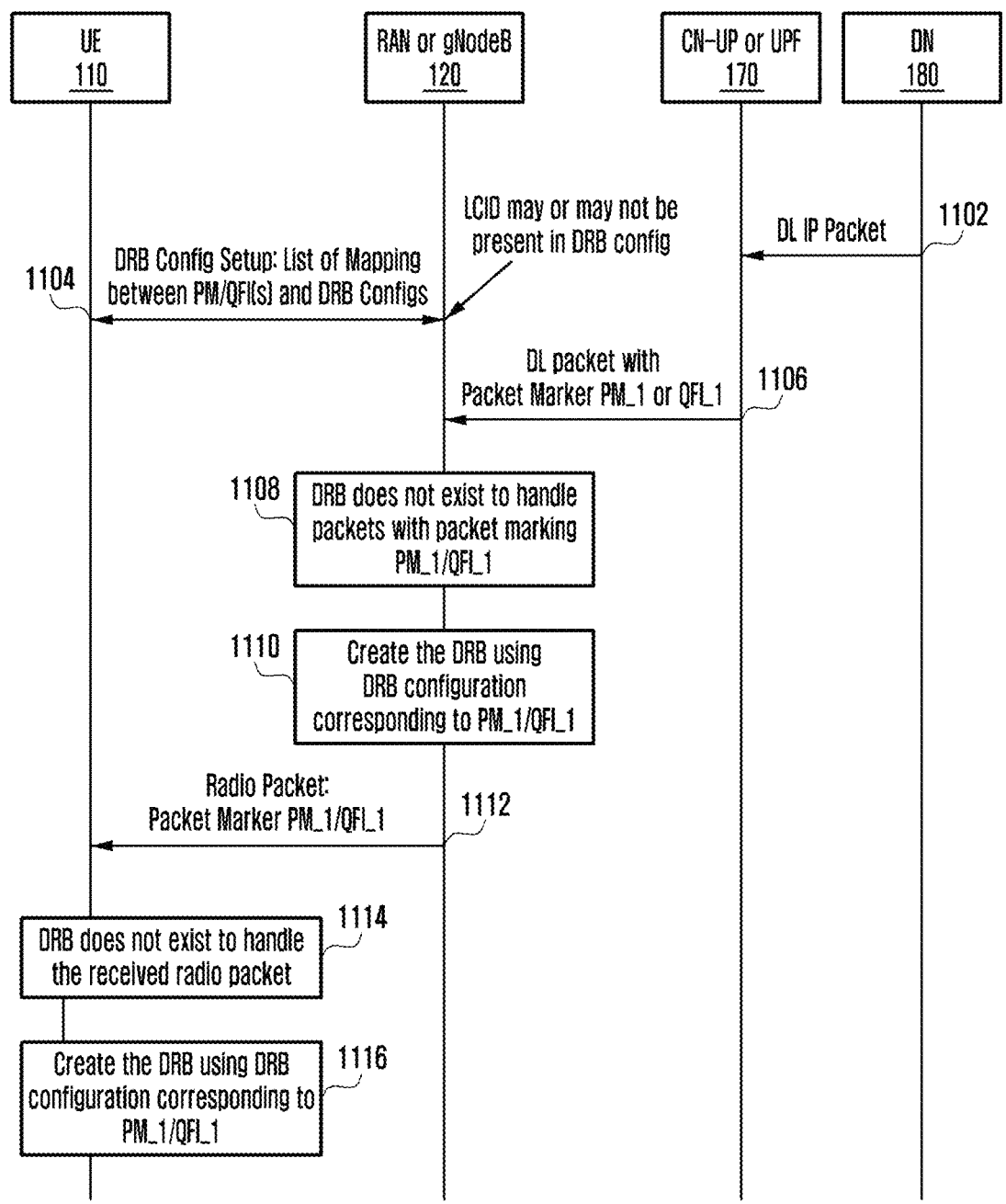
FIG. 11 is a sequence diagram illustrating various operations performed for establishing one or more DRBs in a DL, according to an embodiment as disclosed herein.
Figure 12:
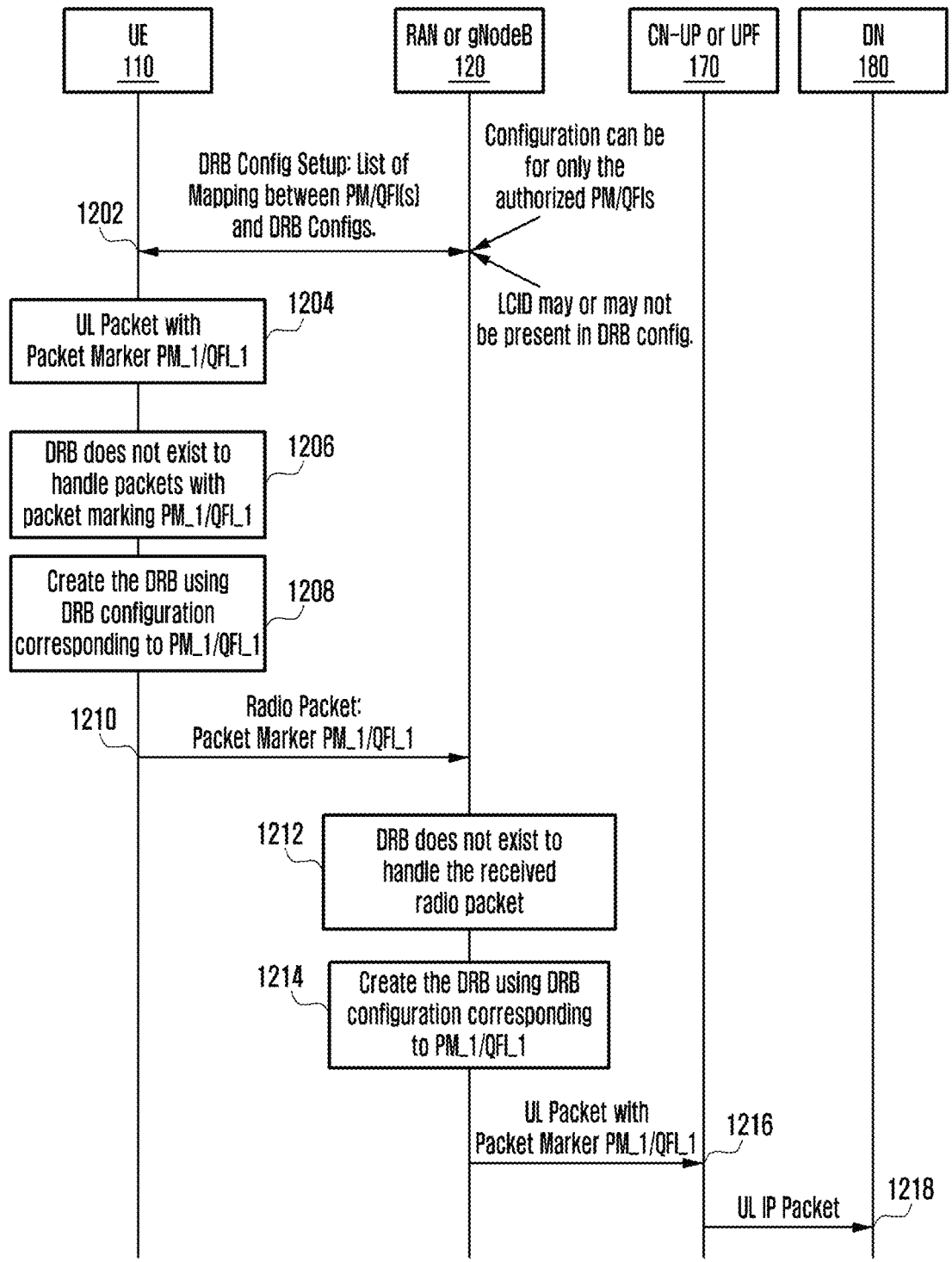
FIG. 12 is a sequence diagram illustrating various operations performed for establishing one or more DRBs in the UL, according to an embodiment as disclosed herein.

FIG. 11 is a sequence diagram illustrating various operations performed for establishing one or more DRBs in the DL, and FIG. 12 is a sequence diagram illustrating various operations performed for establishing one or more DRBs in the UL, according to an embodiment as disclosed herein.

In an embodiment, the RAN (or gNodeB) 120 provides mapping between one or more DRBs and the QoS flows (identified by the QoS flow identifier/PM) to the UE 110 in the RRC signaling message (e.g., RRC connection reconfiguration message). The DRB configuration includes the L2 configuration similar to the DRB configuration in the existing system is provided for each DRB. For example, the DRB configuration may include the SDAP configuration, the PDCP configuration, the RLC configuration, the MAC configurations, etc. Each DRB is mapped to one or more PM/QFIs. For each DRB configured, the RAN (or gNB) 120 provides the list of one or more QFIs and optionally PDU session identifier. The QoS flows of same PDU session can be mapped to same DRB. The QoS flow of the PDU session is not mapped to more than one DRB. The QoS flow of one PDU session and another QoS flow of another PDU session may have same QoS Flow ID but these are mapped to different DRBs. In other words, the QoS flows of different PDU sessions are not mapped to same DRB.

Further, if QoS flows of different PDU sessions are mapped to same DRB, then on receiving the packet from UE 110 on the DRB, the gNB 120 cannot identify the PDU session associated with this packet and hence the gNB 120 will not be able to identify the tunnel on which this packet should be sent to the UPF 170. Note that, the tunnel is different for each PDU session. The RAN 120 also indicates whether each DRB is an UL DRB or DL DRB or bidirectional DRB. The logical channel ID may or may not be present in the DRB configuration. However, the LCG ID is included. In one embodiment, in case LCD is included, for the DL only DRB, the PM/QFI and PDU session id may not be included.

The PM/QFIs, for which DRB configuration is provided, can be the QFIs/PMs for which UE 110 is authorized. The RAN (or gNodeB) 120 may obtain the PM/QFIs when the RAN 120 receives the RRC connection request from the UE 110. The RAN (or gNodeB) 120 may obtain the PM/QFIs from the CP function in the CN. Alternately, the UE 110 may send the PM/QFIs to the RAN (or gNodeB) 120. Further, the UE 110 may be pre-configured with the authorized QFIs/PMs or the UE 110 may obtain the PM/QFIs from the CP function in the CN.

The QoS parameters of the QoS flow are also provided to the RAN (or gNodeB) 120 as the QoS profile when the PDU session is established or the new QoS flow is established or when the radio connection is established. The QoS parameters may also be pre-configured in the RAN 120. The RAN (or gNodeB) 120 knows the mapping between each QFI/PM and associated QoS parameters and accordingly decides the radio configuration for corresponding DRB. The QoS parameters (e.g., packet error rate, latency, data rate, etc.) which are related to the radio level QoS can be same for two QFIs/PMs and hence multiple QFIs/PMs can be mapped to same DRB.

In the proposed method, the DRB is established as shown in FIG. 11 for the DL and as shown in the FIG. 12 for the UL.

DL DRB creation: In the proposed method, the RAN (or gNodeB) 120 receives the packet in the DL from the UP function in the CN. The RAN (or gNodeB) 120 receives the PM/QFI associated with the packet along with the packet marking. The RAN (or gNodeB) 120 checks if the DRB is already established for the PM/QFI associated with received packet or not.

If not then, in an embodiment, the RAN (or gNodeB) 120 may create the DRB using the DRB configuration corresponding to the PM/QFI and the PDU session and adds the packet in the DRB queue. Further, the RAN (or gNodeB) 120 sends the packet to the UE 110 and may include the PM/QFI and optionally PDU session id in the packet header.

If not then, in an embodiment, the RAN (or gNodeB) 120 may add the QoS flow corresponding to the PM/QFI of received packet to one of the existing DRB. Further, the RAN (or gNodeB) 120 updates the DRB configuration to the QoS flows mapping. Further, the RAN (or gNodeB) 120 sends the RRC signaling message to the UE 110 with updated DRB configurations to the QoS flows mapping. Further, the RAN (or gNodeB) 120 adds the packet in the queue of DRB to which the QoS flow of receive packet is mapped.

If yes, the RAN (or gNodeB) 120 adds the packet in the DRB queue.

On receiving the packet in the DL, the UE 110 obtains the LCID and determines if there exists the DRB corresponding to the LCD. If yes, the UE 110 maps the packet to that DRB. If not, then there are two approaches:

Approach 1 (as shown in the FIG. 11): The UE 110 obtains the PM/QFI and optionally PDU session identifier for the received packet. Further, the UE 110 creates the DRB using the DRB configuration corresponding to PM/QFI and optionally PDU session id and adds the packet in this DRB queue. The LCID of the logical channel associated with this new DRB is the LCID of the received packet.

Approach 2: Alternately, the UE 110 creates the DRB using the DRB configuration corresponding to the LCID and adds the packet in the DRB queue. Note that, the DRB configuration configured for each PM/QFI may have LCD. So, based on the LCD, the UE 110 can identify the DRB configuration to be used for creating the DRB. The LCID of the logical channel associated with this new DRB is the LCID of the received packet.

In an embodiment, the UE 110 may decide to follow approach 1 or approach 2 depending on whether the LCID is included in the DRB configuration or not. The RAN (or gNodeB) 120 may include the PM/QFI and optionally PDU session id in the packet header depending on whether the LCID is included in the DRB configuration or not.

UL DRB Creation: In the UL, the access stratum layer in UE receives the packet to be transmitted and associated the PM PM/QFI and optionally PDU session identifier from the higher layer (e.g., NAS layer or application layer). Further, the UE 110 checks if the DRB is already established for the PM/QFI and optionally the PDU session identifier associated with received packet or not.

If not, the UE 110 creates the DRB using the DRB configuration corresponding to the PM/QFI and optionally the PDU session identifier and adds the packet in the DRB queue. If the LCID is not included in the DRB configuration, the UE 110 itself assigns an unused LCID for the DRB. Further, the UE 110 sends the packet to the RAN (or gNodeB) 120 and may include the PM/QFI and the PDU Session ID in the packet header. If the LCID is included in the DRB configuration, the UE 110 may not include the PM/QFI and PDU session identifier in the packet header.

If yes, the UE 110 adds the packet in that the DRB queue.

In an embodiment, on receiving the packet from the UE 110, the RAN (or gNodeB) 120 checks if the DRB is already established for the PM/QFI and the PDU session id associated with received packet or not. If not, the RAN (or gNodeB) 120 creates the DRB using the DRB configuration corresponding to the PM/QFI and the PDU session identifier and adds the packet in this DRB queue. If yes, the RAN (or gNodeB) 120 adds the packet in the DRB queue.

In an embodiment, on receiving the packet in the UL, the RAN (or gNodeB) 120 obtains the LCID and determines if there exists the DRB corresponding to this LCD. If yes, the RAN (or gNodeB) 120 maps the packet to that DRB. If not, then there are two approaches:

Approach 1: The RAN (or gNodeB) 120 obtains the PM/QFI and PDU session identifier for the received packet. Further, the RAN (or gNodeB) 120 creates the DRB using the DRB configuration corresponding to the PM/QFI and optionally the PDU session identifier and adds the packet in the DRB queue. The LCID of the logical channel associated with the new DRB is the LCID of the received packet.

Approach 2: Alternately, the RAN (or gNodeB) 120 creates the DRB using the DRB configuration corresponding to the LCID and adds the packet in the DRB queue. Note that, the DRB configuration configured for each PM/QFI and optionally PDU session identifier may have the LCD. So, based on the LCD, the RAN (or gNodeB) 120 can identify the DRB configuration to be used for creating the DRB. The LCID of the logical channel associated with the new DRB is the LCID of the received packet.

In an embodiment, the RAN (or gNodeB) 120 decides to follow approach 1 or approach 2 depending on whether the LCID is included in the DRB configuration or not. The UE 110 may include the PM/QFI and the optionally PDU session identifier in the packet header depending on whether the LCID is included in the DRB configuration or not.

Further, the RAN (or gNodeB) sends the packet to the UPF 170 and may include the PM/QFI in the packet header. The packet is transmitted to the UPF 170 on the tunnel associated with the PDU session of the packet.

In an embodiment, the PM/QFI and optionally the PDU session identifier may be included in the BSR. On receiving the PM/QFI and optionally PDU session identifier in the BSR, if there does not exist the DRB for the PM/QFI and optionally the PDU session identifier, then the RAN (or gNodeB) 120 creates the DRB. In this case, the UE 110 does not include the PM/QFI in the UL packet. Alternately, the LCID may be included in the BSR. On receiving the LCID in the BSR, if there does not exist the DRB for this LCID then the RAN (or gNodeB) 120 creates the DRB. In this case, the UE 110 does not need to include the PM/QFI and optionally the PDU session identifier in the UL packet. Note that, the DRB configuration configured for each PM/QFI and PDU session identifier may have the LCID. So that, based on LCID, the RAN (or gNodeB) 120 can identify the DRB configuration to be used for creating the DRB. The LCID of the logical channel associated with this new DRB is the LCID of the received packet.

As shown in the FIG. 11, the DN 180 sends (1102) the DL IP packet to the UPF 170. The DRB configuration Setup: List of Mapping between PM/QFI(s) and DRB configuration is established (1104) between the UE 110 and the RAN 120. The UPF sends (1106) the DL packet along with Packet Marker PM_1 or QFI_1 to the RAN 120. Further, the RAN determines (1108) that the DRB does not exist to handle packets with packet marking PM_1/QFI_1. The RAN creates (1110) the DRB using the DRB configuration corresponding to PM_1/QFI_1. The RAN 120 sends (1112) the radio packet along with Packet Marker PM_1/QFI_1. The UE 110 determines (1114) that the DRB does not exist to handle the received radio packet. The UE 110 creates (1116) the DRB using DRB configuration corresponding to PM_1/QFI_1

As shown in the FIG. 12, the DRB Config Setup: List of Mapping between PM/QFI(s) and DRB configuration is established (1202) between the UE 110 and the RAN 120. Further, the UE 110 receives (1204) the UL packet with the Packet Marker PM_1/QFI_1. Further, the UE 110 determines (1206) that the DRB does not exist to handle packets with packet marking PM_1/QFI_1. Further, the UE 110 creates (1208) the DRB using DRB configuration corresponding to PM_1/QFI_1. Further, the UE 110 sends (1210) the radio packet along with Packet Marker PM_1/QFI_1 to the RAN 120. Further, the RAN 120 determines (1212) that the DRB does not exist to handle the received radio packet. Further, the RAN 120 creates (1214) the DRB using DRB configuration corresponding to PM_1/QFI_1. Further, the RAN 120 sends (1216) the UL packet along with the Packet marker PM_1/QFI_1 to the UPF 170. The UPF 170 sends (1218) the UL IP packet to the DN 140.

Figure 13:
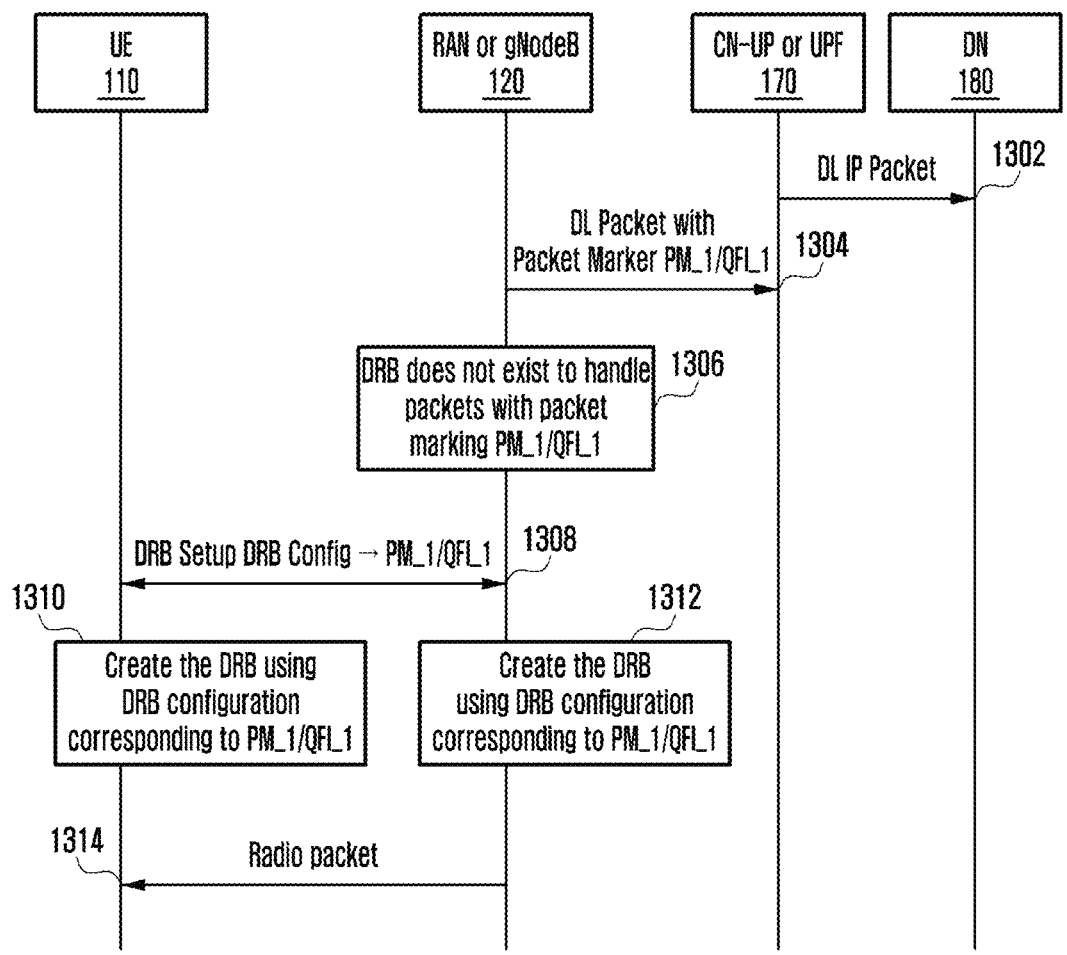
FIG. 13 is a sequence diagram illustrating various operations performed for the DRB setup in the DL, according to an embodiment as disclosed herein.

FIG. 13 is a sequence diagram illustrating various operations performed for the DRB establishment in the DL, according to an embodiment as disclosed herein.

The QoS parameters of the QoS flow are also provided to the RAN (or gNodeB) 120 as the QoS profile when the PDU session is established or the new QoS flow is established or when the radio connection is established. Further, the QoS parameters may also be pre-configured in the RAN 120. In the RAN 120, the DRB defines the packet treatment on the radio interface (Uu). The DRB serves packets with the same packet forwarding treatment. The separate DRBs may be established for the QoS flows requiring different packet forwarding treatment. The RAN (or gNodeB) 120 knows the mapping between each QoS flow and associated QoS parameters (or QoS profile) and accordingly decides the radio configuration for corresponding data radio bearer. In the downlink, the RAN (or gNodeB) 120 maps the QoS flows to the DRBs based on the packet marking (i.e., QoS Flow ID) and the associated QoS profiles. For the uplink, the RAN (or gNodeB) 120 provides the QoS flow to the DRB mapping in the RRC signaling message. One DRB can be mapped to multiple QoS flows. For each DRB configured, the RAN (or gNodeB) 120 provides the list of one or more QFIs and PDU session identifier. The QoS parameters (e.g., packet error rate, latency, data rate, etc.) which are related to radio level QoS can be same for multiple QoS flows and hence multiple QoS flows of same PDU session can be mapped to same DRB. The QoS flow of the PDU session is not mapped to more than one DRB. The QoS flow of one PDU session and another QoS flow of another PDU session may have same QoS Flow ID but these are mapped to different DRBs. In other words, the QoS flows of different PDU sessions are not mapped to same DRB.

If the QoS flows of different PDU sessions are mapped to same DRB, then on receiving the packet from the UE 110 on the DRB, the gNodeB 120 cannot identify the PDU session associated with this packet and hence the gNB 120 will not be able to identify the tunnel on which this packet should be sent to the UPF. Note that the tunnel is different for each PDU session.

In the proposed method, the DN 180 sends (1302) the DL IP packet to the UPF 170. The RAN (or gNodeB) 120 receives (1304) the packet in the DL from the UP function in the CN. Further, the RAN (or gNodeB) 120 receives the PM/QFI associated with the packet along with the packet marking. The RAN (or gNodeB) 120 checks (1306) if the DRB is already established for the PM/QFI and optionally the PDU session associated with received packet or not. If not, the RAN (or gNodeB) 120 initiates (1308) the DRB setup. The RAN (or gNodeB) 120 sends DRB configuration message including the DRB configuration and its mapping to one or more PM/QFIs and optionally PDU session identifier. The RAN (or gNodeB) 120 knows the mapping between each PM/QFI and associated QoS parameters and accordingly decides the radio configuration for corresponding DRB. The QoS parameters which are related to radio level QoS can be same for two PM/QFIs and hence multiple PM/QFIs can be mapped to same DRB, so that the RAN (or gNodeB) 120 may add the PM/QFI of received packet to the list of PM/QFIs for an existing DRB or add a new DRB and provide new DRB configuration for the PM/QFI of the received packet. If new DRB is added, the UE 110 creates (1310) the new DRB corresponding to new configuration and PM/QFI included in the DRB configuration message.

In response, the UE 110 may send DRB configuration complete message. After receiving the DRB configuration complete message, the RAN (or gNodeB) 120 creates (1312) the DRB using the DRB configuration corresponding to PM/QFI of received packet if new DRB configuration is added for this PM/QFI and adds the packet in this DRB queue. If the PM/QFI of received packet is added to existing DRB then the packet is mapped (1312) to that DRB queue.

Figure 14:
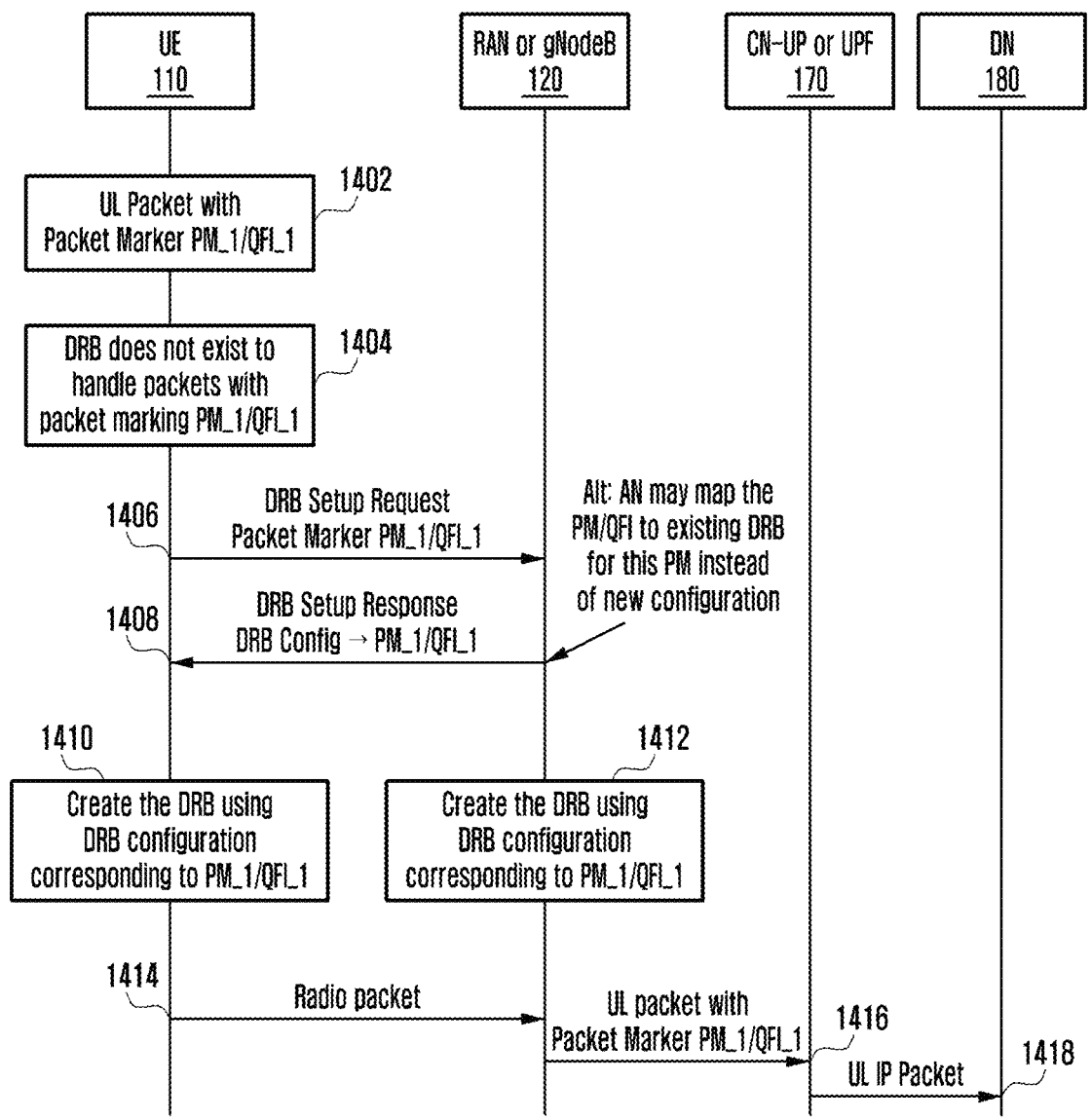
FIG. 14 is a sequence diagram illustrating various operations performed for establishing the data radio bearer in the DL, according to an embodiment as disclosed herein.

FIG. 14 is a sequence diagram illustrating various operations performed for DRB establishment in the DL, according to an embodiment as disclosed herein. In an embodiment, in the UL, the access stratum layer receives (1402) the packet to be transmitted and associated PM/QFI and optionally the PDU session identifier from the higher layer (e.g., NAS layer or application layer). Further, the UE 110 checks (1404) if the DRB is already established for the PM/QFI and optionally the PDU session identifier associated with received packet or not. If not, the UE initiates (1406) the DRB setup. Then UE 110 sends DRB configuration request message including the PM/QFI and optionally the PDU session identifier of the received packet. On receiving the DRB configuration request message with PM/QFI and PDU session identifier, the RAN (or gNodeB) 120 decides (1408) the radio configuration for corresponding DRB. The RAN (or gNodeB) 120 knows the mapping between each PM/QFI and associated QoS parameters and accordingly decides the radio configuration. The QoS parameters which are related to the radio level QoS can be same for two PM/QFIs and hence multiple PM. Further, the QFIs can be mapped to same DRB, so that the RAN (or gNodeB) 120 may add the PM/QFI received in the DRB configuration request message to list of PM/QFIs for an existing DRB or add the new DRB and provide new DRB configuration for the PM/QFI and PDU session id of received packet. Further, the RAN (or gNodeB) 120 sends the DRB configuration message to the UE 110.

If new DRB is added then the UE 110 creates (1410) the new DRB corresponding to new configuration and the PM/QFI included in the DRB configuration message. In response, the UE 110 may send DRB configuration complete message. After receiving the DRB configuration complete message, the RAN (or gNodeB) 120 creates (1412) the DRB using the DRB configuration if new DRB configuration is added for the PM/QFI.

Further, the UE 110 sends the radio packet to the RAN (or gNodeB) 120. Further, the RAN 120 sends the (1416) the UL packet along with the packet marker PM_1/QFI_1 to the UPF 170. The UPF 170 sends (1418) the UL IP packet to the DN 140.

In an embodiment, each DRB is associated with the PDCP entity, multiple RLC entities and logical channels. In the proposed method, the packets with different PM/QFI or packets of different flows are processed by same PDCP entity. The PDCP PDUs associated with different PM/QFI or different flows are processed by different RLC entity. The RLC PDUs of each RLC entity is processed or mapped to different logical channel.

Further, the RAN (or gNodeB) 120 may provide one or more DRB configurations. Each DRB configuration is associated with one or more PM/QFIs or flows. There is one PDCP configuration per DRB. There can be multiple RLC configurations per DRB. Each RLC configuration is mapped to one or more PM/QFIs or flows. Further, the UE 110 creates RLC entity and logical channel for each RLC configuration. There can be multiple logical channel configurations per DRB. Number of logical channel configurations is equal to number of RLC configurations. That is, there is one to one mapping between logical channel and RLC entity.

The advantage of this approach is that functions like ROHC; securities which are same for each flow can be applied using one PDCP entity. RLC/logical channel functions are flow specific and hence applied independently.

In an embodiment, the RAN (or gNodeB) 120 may provide one or more DRB configurations. Each DRB configuration is associated with one or more PM/QFIs or flows. There is one PDCP configuration per DRB. There is one RLC configuration per DRB. The logical channel configuration can be different for different PM/QFI or flows. This means that each DRB is mapped to multiple logical channels. The RLC PDUs of different flows/PM/QFIs are mapped to different logical channels. The advantage of this approach is that functions like ROHC; securities, ARQ which are same for each flow can be applied using one PDCP/RLC entity. The logical channel functions are flow specific and hence applied independently.

In an embodiment, the UE 110 may handover from one RAN (or gNodeB) also referred as source gNodeB to another RAN (or gNodeB) also referred as target gNodeB due to mobility. In this case to avoid any loss of packets, the source gNodeB may transmit to target gNodeB, one or more packets received by the source gNodeB from the network entity 160. The packets which are either not yet transmitted by the source gNodeB to the UE 110 or the packets which are transmitted but not yet acknowledged by the UE 110 are transmitted the source gNodeB to the target gNodeB. In order to enable the target gNodeB to map these packets to appropriate DRBs the source gNodeB provides to the target gNodeB, the QFI and optionally the PDU session identifier of the PDU session associated with each packet. The target gNodeB can then map these packets of each PDU session to the DRBs based on the QFI using the methods explained earlier wherein the gNodeB 120 maps the packets received from the network entity 160 to DRBs based on the QFI.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method performed by a base station in a wireless communication system, the method comprising:
   transmitting, to a terminal, a radio resource control (RRC) signaling message including first information indicating at least one quality of service (QoS) flow identifier (ID) (QFI) mapped to a data radio bearer (DRB); and
   receiving, from the terminal, a first uplink packet on a default DRB based on the RRC signaling message,
   wherein there is no mapping of a first QFI associated with the first uplink packet to at least one DRB, and
   wherein the RRC signaling message further includes second information on an identifier (ID) of a protocol data unit (PDU) session.

2. The method of claim 1, wherein the first QFI is included in a service data adaptation protocol (SDAP) header for the first uplink packet.

3. The method of claim 1, further comprising:
   receiving, from the terminal, a second uplink packet on the DRB, in case that the first information indicates that a second QFI associated with the second uplink packet is mapped to the DRB.

4. The method of claim 1, further comprising:
determining a new DRB for the first QFI;
performing a procedure to set up the new DRB with the terminal;
transmitting, to the terminal, information on a mapping between the first QFI and the new DRB; and
receiving, from the terminal, a new uplink packet associated with the first QFI on the new DRB based on the information.

5. The method of claim 1, further comprising:
receiving, from a user plane function (UPF), a downlink packet with a new QFI;
determining an existing DRB for the PDU session to transmit the downlink packet with the new QFI;
transmitting, to the terminal, information on a mapping between the new QFI and the existing DRB; and
transmitting, to the terminal, the downlink packet with the new QFI on the existing DRB, based on the information.

6. The method of claim 1, further comprising: transmitting, to the terminal, third information on the default DRB.

7. A method performed by a terminal in a wireless communication system, the method comprising:
receiving, from a base station, a radio resource control (RRC) signaling message including first information indicating at least one quality of service (QoS) flow identifier (ID) (QFI) mapped to a data radio bearer (DRB);
identifying a first QFI associated with a first uplink packet;
identifying whether there is a mapping of the first QFI to at least one DRB, based on the first QFI and the first information; and
transmitting, to the base station, the first uplink packet on a default DRB, in case that no mapping of the first QFI to the at least one DRB is identified,
wherein the RRC signaling message further includes second information on an identifier (ID) of a protocol data unit (PDU) session.

8. The method of claim 7, wherein the first QFI is included in a service data adaptation protocol (SDAP) header for the first uplink packet.

9. The method of claim 7, further comprising:
identifying a second QFI associated with a second uplink packet;
identifying if there is a mapping of the second QFI to the at least one DRB, based on the second QFI and the first information; and
transmitting, to the base station, the second uplink packet on the DRB, in case that the mapping of the second QFI to the DRB is identified.

10. The method of claim 7, further comprising:
performing a procedure to set up a new DRB with the base station;
receiving, from the base station, information on a mapping between the first QFI and the new DRB;
updating the first information based on the information; and
transmitting, to the base station, a new uplink packet associated with the first QFI on the new DRB based on the updated first information.

11. The method of claim 7, further comprising:
receiving, from the base station, information on a mapping between a new QFI and an existing DRB for the PDU session;
updating the first information based on the information; and
receiving, from the base station, a downlink packet with the new QFI on the existing DRB, based on the updated first information.

12. The method of claim 7, further comprising: receiving, from the base station, third information on the default DRB.

13. A base station in a wireless communication system, the base station comprising:
a transceiver; and
a controller configured to:
control the transceiver to transmit, to a terminal, a radio resource control (RRC) signaling message including first information indicating at least one quality of service (QoS) flow identifier (ID) (QFI) mapped to a data radio bearer (DRB), and
control the transceiver to receive, from the terminal, a first uplink packet on a default DRB based on the RRC signaling message,
wherein there is no mapping of a first QFI associated with the first uplink packet to at least one DRB, and
wherein the RRC signaling message further includes second information on an identifier (ID) of a protocol data unit (PDU) session.

14. The base station of claim 13, wherein the first QFI is included in a service data adaptation protocol (SDAP) header for the first uplink packet.

15. The base station of claim 13, wherein the controller is further configured to control the transceiver to receive, from the terminal, a second uplink packet on the DRB, in case that the first information indicates that a second QFI associated with the second uplink packet is mapped to the DRB.

16. The base station of claim 13, wherein the controller is further configured to determine a new DRB for the first QFI, perform a procedure to set up the new DRB with the terminal, control the transceiver to transmit, to the terminal, information on a mapping between the first QFI and the new DRB, and control the transceiver to receive, from the terminal, a new uplink packet associated with the first QFI on the new DRB based on the information.

17. The base station of claim 13, wherein the controller is further configured to control the transceiver to receive, from a user plane function (UPF), a downlink packet with a new QFI, determine an existing DRB for the PDU session to transmit the downlink packet with the new QFI, control the transceiver to transmit, to the terminal, information on a mapping between the new QFI and the existing DRB, and control the transceiver to transmit, to the terminal, the downlink packet with the new QFI on the existing DRB, based on the information.

18. The base station of claim 13, wherein the controller is further configured to control the transceiver to transmit, to the terminal, third information on the default DRB.

19. A terminal in a wireless communication system, the terminal comprising:
a transceiver; and
a controller configured to:
control the transceiver to receive, from a base station, a radio resource control (RRC) signaling message including first information indicating at least one quality of service (QoS) flow identifier (ID) (QFI) mapped to a data radio bearer (DRB),
identify a first QFI associated with a first uplink packet,
identify whether there is a mapping of the first QFI to at least one DRB, based on the first QFI and the first information, and
control the transceiver to transmit, to the base station, to the base station, the first uplink packet on a default DRB, in case that no mapping of the first QFI to the at least one DRB is identified, wherein the RRC signaling message further includes third information on an identifier (ID) of a protocol data unit (PDU) session.

20. The terminal of claim 19, wherein the first QFI is included in a service data adaptation protocol (SDAP) header for the first uplink packet.

21. The terminal of claim 19, wherein the controller is further configured to control the transceiver to identify a second QFI associated with a second uplink packet, identify if there is a mapping of the second QFI to the at least one DRB, based on the second QFI and the first information, and control the transceiver to transmit, to the base station, the second uplink packet on the DRB, in case that the mapping of the second QFI to the DRB is identified.

22. The terminal of claim 19, wherein the controller is further configured to perform a procedure to set up a new DRB with the base station, control the transceiver to receive, from the base station, information on a mapping between the first QFI and the new DRB, update the first information based on the information, and control the transceiver to transmit, to the base station, a new uplink packet associated with the first QFI on the new DRB based on the updated first information.

23. The terminal of claim 19, wherein the controller is further configured to control the transceiver to receive, from the base station, information on a mapping between a new QFI and an existing DRB for the PDU session, update the first information based on the information, and control the transceiver to receive, from the base station, a downlink packet with the new QFI on the existing DRB, based on the updated first information.

24. The terminal of claim 19, wherein the controller is further configured to control the transceiver to receive, from the base station, third information on the default DRB.

* * * * *